United States Patent
Terashima et al.

(10) Patent No.: US 8,988,006 B2
(45) Date of Patent: Mar. 24, 2015

(54) PROJECTOR

(75) Inventors: Tetsuo Terashima, Azumino (JP); Shun Sato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 624 days.

(21) Appl. No.: 13/407,158

(22) Filed: Feb. 28, 2012

(65) Prior Publication Data
US 2012/0242965 A1   Sep. 27, 2012

(30) Foreign Application Priority Data
Mar. 23, 2011   (JP) .................. 2011-064816

(51) Int. Cl.
*H05B 37/02* (2006.01)
*G03B 21/20* (2006.01)

(52) U.S. Cl.
CPC .................. *G03B 21/2026* (2013.01)
USPC .............. 315/307; 315/246; 315/360; 353/7; 353/85

(58) Field of Classification Search
None
See application file for complete search history.

(56) References Cited

U.S. PATENT DOCUMENTS

| | | | |
|---|---|---|---|
| 2008/0218094 A1* | 9/2008 | Nakada et al. | 315/224 |
| 2009/0051300 A1* | 2/2009 | Deppe et al. | 315/307 |
| 2010/0148686 A1* | 6/2010 | Arimoto et al. | 315/246 |
| 2012/0286695 A1* | 11/2012 | Yamashita et al. | 315/287 |

FOREIGN PATENT DOCUMENTS

| | | |
|---|---|---|
| JP | A-2003-102030 | 4/2003 |
| JP | A-2005-235445 | 9/2005 |
| JP | A-2008-153142 | 7/2008 |
| JP | A-2008-270058 | 11/2008 |
| JP | A-2009-237302 | 10/2009 |

* cited by examiner

*Primary Examiner* — Jany Richardson
(74) *Attorney, Agent, or Firm* — Oliff PLC

(57) ABSTRACT

A projector includes: a discharge lamp; a discharge lamp driving unit that drives the discharge lamp by supplying a driving power to the discharge lamp through supply of a driving current thereto; and a control unit that controls the discharge lamp driving unit based on plural operating modes in which maximum values of the driving power are different from one another, wherein the control unit switches the operating mode through a transition period and controls the discharge lamp driving unit so that an average value of a frequency of the driving current in the former half of the transition period becomes larger than an average value of a frequency of the driving current in the latter half of the transition period.

12 Claims, 20 Drawing Sheets

FIRST POLARITY STATE P1

SECOND POLARITY STATE P2

PROJECTOR

BACKGROUND

1. Technical Field

The present invention relates to a projector.

2. Related Art

A projector using a discharge lamp, such as a high pressure mercury lamp or a metal halide lamp, as a light source has been put into practical use. In such a discharge lamp, the shape of an electrode may be changed due to exhaustion of the electrode caused by discharge, and thus flicker in that a discharge start position is quickly changed may occur. If flicker occurs, the luminance of the discharge lamp is abruptly changed. Accordingly, if flicker occurs in the discharge lamp that is used in the projector, it would be jarring on a user.

In order to solve this problem, JP-A-2005-235445 discloses a light source device that prevents the occurrence of flicker through heightening of electric power that is supplied to a discharge lamp when flicker is detected.

However, it is preferable to prevent the occurrence of flicker in advance. Accordingly, there is a need for reducing the risk that flicker occurs.

SUMMARY

An advantage of some aspects of the invention is to provide a projector that can suppress the occurrence of flicker.

An aspect of the invention is directed to a projector, which includes a discharge lamp; a discharge lamp driving unit driving the discharge lamp by supplying a driving power to the discharge lamp through supply of a driving current thereto; and a control unit having plural operating modes in which maximum values of the driving power are different from one another and controlling the discharge lamp driving unit based on the operating modes, wherein the control unit switches the operating mode through a transition period and controls the discharge lamp driving unit so that an average value of a frequency of the driving current in the former half of the transition period becomes larger than an average value of a frequency of the driving current in the latter half of the transition period.

If the operating mode is switched, the maximum value of the driving power is changed. In the aspect of the invention, since the control unit switches the operating mode through the transition period and controls the discharge lamp driving unit so that the average value of the frequency of the driving current in the former half of the transition period becomes larger than the average value of the frequency of the driving current in the latter half of the transition period, the position of the origin of discharge on an electrode of the discharge lamp can be early stabilized in the case where the maximum value of the driving power becomes smaller through the switching of the operating mode. Further, in the case where the maximum value of the driving power becomes larger through the switching of the operating mode, a loss of a protrusion that becomes the origin of the discharge on the electrode of the discharge lamp can be suppressed. Accordingly, a projector that can suppress the occurrence of flicker can be realized.

In the projector according to the aspect of the invention, the control unit may control the discharge lamp driving unit so that a minimum value of the frequency of the driving current in the former half of the transition period becomes larger than a minimum value of the frequency of the driving current in the latter half of the transition period.

By this, in the case where the maximum value of the driving power becomes smaller through the switching of the operating mode, the position of the origin of the discharge on the electrode of the discharge lamp can be earlier stabilized. Further, in the case where the maximum value of the driving power becomes larger through the switching of the operating mode, the loss of the protrusion that becomes the origin of the discharge on the electrode of the discharge lamp can be further suppressed. Accordingly, a projector that can further suppress the occurrence of flicker can be realized.

In the projector according to the aspect of the invention, in the case where the operating mode after the transition period is a mode that repeats a first period in which the driving power is relatively low and a second period in which the driving power is relatively high, the control unit may control the discharge lamp driving unit so that a minimum value of the frequency of the driving current in the second period in the former half of the transition period becomes larger than a minimum value of the frequency of the driving current in the second period in the latter half of the transition period.

Since the driving power is higher in the second period rather than in the first period, it exerts a great influence on the electrode state of the discharge lamp. Accordingly, by controlling the discharge lamp driving unit so that the minimum value of the frequency of the driving current in the second period in the former half of the transition period becomes larger than the minimum value of the frequency of the driving current in the second period in the latter half of the transition period, the occurrence of flicker can be further suppressed.

In the projector according to the aspect of the invention, the control unit may control the discharge lamp driving unit so that a ratio of time when the frequency of the driving current in the former half of the transition period becomes a minimum value to time in the former half of the transition period becomes smaller than a ratio of time when the frequency of the driving current in the latter half of the transition period becomes a minimum value to time in the latter half of the transition period.

By this, in the case where the maximum value of the driving power becomes smaller through the switching of the operating mode, the position of the origin of the discharge on the electrode of the discharge lamp can be early stabilized. Further, in the case where the maximum value of the driving power becomes larger through the switching of the operating mode, the loss of the protrusion that becomes the origin of the discharge on the electrode of the discharge lamp can be suppressed. Accordingly, a projector that can further suppress the occurrence of flicker can be realized.

In the projector according to the aspect of the invention, in the case where the operating mode after the transition period is a mode that repeats a first period in which the driving power is relatively low and a second period in which the driving power is relatively high, the control unit may control the discharge lamp driving unit so that a ratio of time when the frequency of the driving current in the second period in the former half of the transition period becomes a minimum value to time in the former half of the transition period becomes smaller than a ratio of time when the frequency of the driving current in the second period in the latter half of the transition period becomes a minimum value to time in the latter half of the transition period.

Since the driving power is higher in the second period rather than in the first period, it exerts a great influence on the electrode state of the discharge lamp. Accordingly, by controlling the discharge lamp driving unit so that the ratio of time when the frequency of the driving current in the second period in the former half of the transition period becomes the minimum value to time in the former half of the transition period becomes smaller than the ratio of time when the frequency of the driving current in the second period in the latter half of the transition period becomes the minimum value to time in the latter half of the transition period, the occurrence of flicker can be further suppressed.

In the projector according to the aspect of the invention, the control unit may control the discharge lamp driving unit so that a length of the transition period becomes longer as time when the operating mode just before the transition period continues becomes longer.

As the time when a specified operating mode continues becomes longer, the shape of the electrode of the discharge lamp becomes a shape which is stable and is easily driven in the operating mode, and thus a difference between the shape and a shape which is stable and is easily driven in another operating mode becomes larger. Accordingly, by controlling the discharge lamp driving unit so that the length of the transition period becomes longer as the time when the operating mode just before the transition period continues becomes longer, and by changing the shape of the electrode gently, the occurrence of flicker can be further suppressed.

In the projector according to the aspect of the invention, the control unit may control the discharge lamp driving unit so that the average value of the frequency of the driving current in the former half of the transition period becomes larger as time when the operating mode just before the transition period continues becomes longer.

As the time when a specified operating mode continues becomes longer, the shape of the electrode of the discharge lamp becomes a shape which is stable and is easily driven in the operating mode, and thus a difference between the shape and a shape which is stable and is easily driven in another operating mode becomes larger. Accordingly, by controlling the discharge lamp driving unit so that the average value of the frequency of the driving current in the former half of the transition period becomes larger as time when the operating mode just before the transition period continues becomes longer, the position of the origin of the discharge on the electrode of the discharge lamp can be earlier stabilized in the case where the maximum value of the driving power becomes smaller through the switching of the operating mode. Further, in the case where the maximum value of the driving power becomes larger through the switching of the operating mode, the loss of the protrusion that becomes the origin of the discharge on the electrode of the discharge lamp can be further suppressed. Accordingly, a projector that can further suppress the occurrence of flicker can be realized.

In the projector according to the aspect of the invention, the control unit may control the discharge lamp driving unit so that a length of the transition period becomes longer as a difference between the maximum value of the driving power in the operating mode before the transition period and the maximum value of the driving power in the operating mode after the transition period becomes larger.

As the difference between the maximum value of the driving power in the operating mode before the transition period and the maximum value of the driving power in the operating mode after the transition period becomes larger, a difference between the shape of the electrode of the discharge lamp which is stable and is easily driven in the operating mode before the transition period and the shape of the electrode of the discharge lamp which is stable and is easily driven in the operating mode after the transition period becomes larger. Accordingly, by controlling the discharge lamp driving unit so that the length of the transition period becomes longer as the difference between the maximum value of the driving power in the operating mode before the transition period and the maximum value of the driving power in the operating mode after the transition period becomes larger, and by changing the shape of the electrode gently, the occurrence of flicker can be further suppressed.

In the projector according to the aspect of the invention, the control unit may control the discharge lamp driving unit so that the average value of the frequency of the driving current in the former half of the transition period becomes larger as a difference between the maximum value of the driving power in the operating mode before the transition period and the maximum value of the driving power in the operating mode after the transition period becomes larger.

As the difference between the maximum value of the driving power in the operating mode before the transition period and the maximum value of the driving power in the operating mode after the transition period becomes larger, a difference between the shape of the electrode of the discharge lamp which is stable and is easily driven in the operating mode before the transition period and the shape of the electrode of the discharge lamp which is stable and is easily driven in the operating mode after the transition period becomes larger. Accordingly, by controlling the discharge lamp driving unit so that the average value of the frequency of the driving current in the former half of the transition period becomes larger as the difference between the maximum value of the driving power in the operating mode before the transition period and the maximum value of the driving power in the operating mode after the transition period becomes larger, the position of the origin of the discharge on the electrode of the discharge lamp can be earlier stabilized in the case where the maximum value of the driving power becomes smaller through the switching of the operating mode. Further, in the case where the maximum value of the driving power becomes larger through the switching of the operating mode, the loss of the protrusion that becomes the origin of the discharge on the electrode of the discharge lamp can be further suppressed. Accordingly, a projector that can further suppress the occurrence of flicker can be realized.

The projector according to the aspect of the invention may further include a state detection unit detecting a deterioration state of the discharge lamp, wherein the control unit may control the discharge lamp driving unit so that a length of the transition period becomes longer in accordance with the progress of the deterioration state.

The state detection unit may detect, for example, a driving voltage of the discharge lamp, temporal change of the driving voltage of the discharge lamp, the light quantity of the discharge lamp, temporal change of the light quantity of the discharge lamp, an accumulated light-on time of the discharge lamp, and the like, as values that indicate the degree of the deterioration state.

Since the meltability of the electrode is lowered with the progress of the deterioration state of the electrode, the electrode is liable to be changed to an unintended shape, and the risk of flicker occurrence becomes heightened. Accordingly, by controlling the discharge lamp driving unit so that the length of the transition period becomes longer in accordance with the progress of the deterioration state, the position of the origin of the discharge on the electrode of the discharge lamp is earlier stabilized, and thus the occurrence of flicker can be suppressed.

The projector according to the aspect of the invention may further include a state detection unit detecting a deterioration state of the discharge lamp, wherein the control unit may control the discharge lamp driving unit so that the average value of the frequency of the driving current in the former half of the transition period becomes larger in accordance with the progress of the deterioration state.

Since the meltability of the electrode is lowered with the progress of the deterioration state of the electrode, the electrode is liable to be changed to an unintended shape, and the risk of flicker occurrence becomes heightened. Accordingly, by controlling the discharge lamp driving unit so that the average value of the frequency of the driving current in the former half of the transition period becomes larger in accordance with the progress of the deterioration state, the position of the origin of the discharge on the electrode of the discharge lamp is earlier stabilized, and thus the occurrence of flicker can be suppressed.

In the projector according to the aspect of the invention, in the case where a first average power that is an average value of the driving power in the operating mode before the transition period is different from a second average power that is an average value of the driving power in the operating mode after the transition period, the control unit may control the discharge lamp driving unit so that the driving power becomes an intermediate value between the first average power and the second average power in at least a part of the transition period.

By changing the driving power gently in the transition period and by changing the shape of the electrode gently, the occurrence of flicker can be further suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. The embodiments to be described hereinafter do not unjustly limit the contents of the invention described in the appended claims. Further, all configurations to be described hereinafter are not always essential constituent elements of the invention.

1. Projector Related to an Embodiment 1-1. Optical System of a Projector

Figure 1:
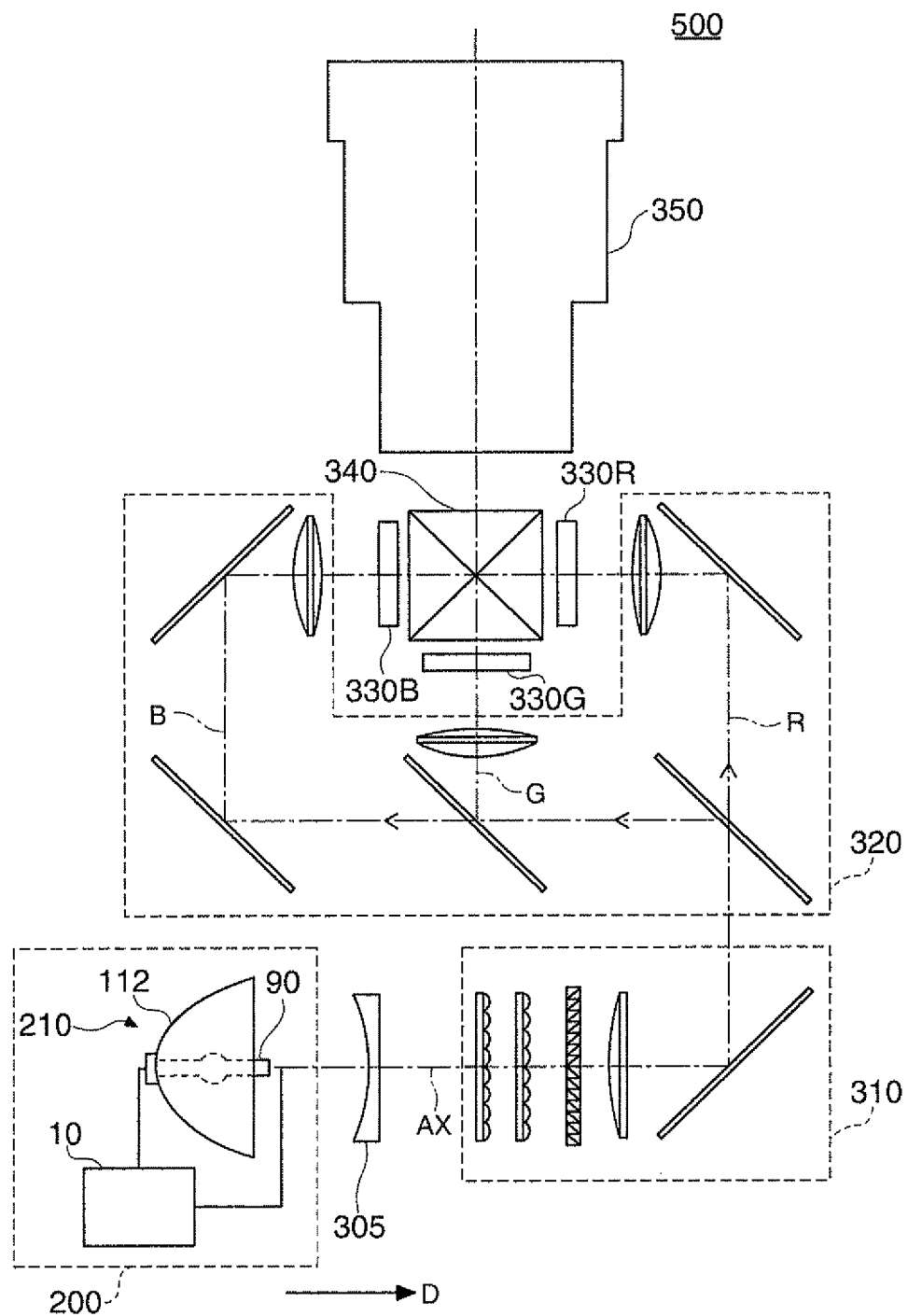
FIG. 1 is an explanatory view illustrating an optical system of a projector related to an embodiment of the invention.

FIG. 1 is an explanatory view illustrating an optical system of a projector 500 related to an embodiment of the invention. A projector 500 includes a light source device 200, a parallel lens 305, an illumination optical system 310, a color separation optical system 320, three light crystal light valves 330R, 330G, and 330B, a cross dichroic prism 340, and a projection optical system 350.

The light source device 200 includes a light source unit 210 and a discharge lamp lighting device 10. The light source unit 210 includes a main reflecting mirror 112, a sub reflecting mirror 50 (to be described later), and a discharge lamp 90. The discharge lamp lighting device 10 supplies a driving power to the discharge lamp 90 to illuminate the discharge lamp 90. The main reflecting mirror 112 reflects light that is emitted from the discharge lamp 90 toward an irradiation direction D. The irradiation direction D is parallel to an optical axis AX. The light from the light source unit 210 passes through the parallel lens 305 and is incident to the illumination optical system 310. The parallel lens 305 parallelizes the light from the light source unit 210.

The illumination optical system 310 uniformizes the illuminance of the light from the light source device 200 in the liquid crystal light valves 330R, 330G, and 330B. Further, the illumination optical system 310 arranges a polarization direction of the light from the light source device 200 in one direction. This is to effectively use the light from the light source device 200 in the liquid crystal light valves 330R, 330B, and 330B. The light of which the illuminance distribution and polarization direction have been adjusted is incident to the color separation optical system 320. The color separation optical system 320 separates the incident light into three colored lights of red (R), green (G), and blue (B). The three colored lights are modulated by the liquid crystal light valves 330R, 330G, and 330B that correspond to the respective colors. The liquid crystal light valves 330R, 330G, and 330B include light crystal panels 560R, 560G, and 560B (to be described later), and polarizing plates (not illustrated) that are arranged on light incident sides and light emission sides of the liquid crystal panels 560R, 560G, and 560B. The three modulated colored lights are synthesized by a cross dicroic prism 340. The synthesized light is incident to the projection optical system 350. The projection optical system 350 projects the incident light onto a screen (not illustrated). By this, an image is displayed on the screen.

Further, diverse configurations can be adopted as the configurations of the parallel lens 305, the illumination optical system 310, the color separation optical system 320, the cross dichroic prism 340, and the projection optical system 350.

Figure 2:
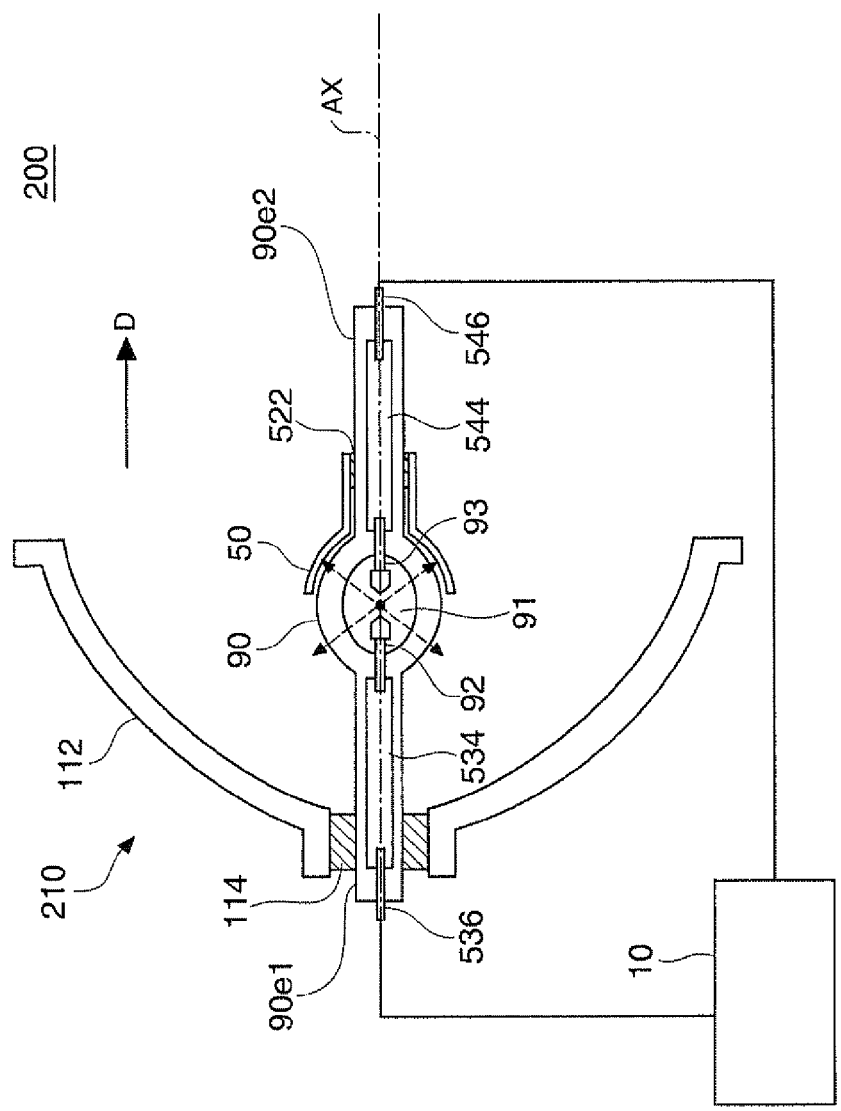
FIG. 2 is an explanatory view illustrating the configuration of a light source device.

FIG. 2 is an explanatory view illustrating the configuration of a light source device 200. The light source device 200 includes the light source unit 210 and the discharge lamp lighting device 10. The drawing is a cross-sectional view of the light source unit 210. The light source unit 210 includes the main reflecting mirror 112, the discharge lamp 90, and the sub reflecting mirror 50.

The discharge lamp 90 is in a bar shape which extends from a first end portion 90e1 to a second end portion 90e2 in an irradiation direction D. The discharge lamp 90, for example, is made of a translucent material such as quartz glass. A center portion of the discharge lamp 90 is in a bulging spherical shape, and a discharge space 91 is formed therein. In the discharge space 91, gases which are discharge media including mercury, rare gases, metal halogen compounds, and the like, are enclosed.

The discharge lamp 90 includes a first electrode 92 and a second electrode 93. In an example illustrated in FIG. 2, the first electrode 92 and the second electrode 93 are formed to protrude in the discharge space 91. The first electrode 92 is arranged on the side of the first end portion 90e1 of the discharge space 91, and the second electrode 93 is arranged on the side of the second end portion 90e2 of the discharge space 91. The first electrode 92 and the second electrode 93 are in a bar shape that extends along the optical axis AX. In the discharge space 91, electrode front end portions (also called "discharge ends") of the first electrode 92 and the second electrode 93 are opposite to each other to be spaced apart from each other for a predetermined distance. The first electrode 92 and the second electrode 93, for example, are made of metal such as tungsten.

A first terminal 536 is installed in the first end portion 90e1 of the discharge lamp 90. The first terminal 536 and the first electrode 92 are electrically connected to each other through a conductive member 534 that passes through the inside of the discharge lamp 90. In the same manner, a second terminal 546 is installed in the second end portion 90e2 of the discharge lamp 90. The second terminal 546 and the second electrode 93 are electrically connected to each other through a conductive member 544 that passes through the inside of the discharge lamp 90. The first terminal 536 and the second terminal 546, for example, are made of metal such as tungsten. Further, as the respective conductive members 534 and 544, for example, a molybdenum foil is used.

The first terminal 536 and the second terminal 546 are connected to the discharge lamp lighting device 10. The discharge lamp lighting device 10 supplies a driving current for driving the discharge lamp 90 to the first terminal 536 and the second terminal 546. As a result, arc discharge occurs between the first electrode 92 and the second electrode 93. Light (discharge light) that is generated by the arc discharge is radiated from the discharge position to all directions as indicated by dashed lines.

The main reflecting mirror 112 is fixed to the first end portion 90e1 of the discharge lamp 90 by a fixing member 114. The reflecting surface of the main reflecting mirror 112 (surface on the side of the discharge lamp 90) is in a rotary elliptical shape. The main reflecting mirror 112 reflects the discharge light toward the irradiation direction D. Further the shape of the reflecting surface of the main reflecting mirror 112 is not limited to the rotary elliptical shape, and diverse shapes that reflect the discharge light toward the irradiation direction D can be adopted. For example, the reflecting surface may adopt a rotary parabolic shape. In this case, the main reflecting mirror 112 can convert the discharge light into light that is almost parallel to the optical axis AX. Accordingly, the parallel lens 305 can be omitted.

The sub reflecting mirror 50 is fixed to the side of the second end portion 90e2 of the discharge lamp 90 by a fixing member 522. The reflecting surface of the sub reflecting mirror 50 (surface on the side of the discharge lamp 90) is in a spherical surface shape that surrounds the side of the second end portion 90e2 of the discharge space 91. The sub reflecting mirror 50 reflects the discharge light toward the main reflecting mirror 112. By this, it is possible to heighten the use efficiency of the light that is radiated from the discharge space 91.

Further, as a material of the fixing members 114 and 522, any heat-resistant material (for example, inorganic adhesives) that endures heat generation of the discharge lamp can be adopted. Further, the method of fixing the arrangement of the main reflecting mirror 112, the sub reflecting mirror 50, and the discharge lamp 90 is not limited to the method of fixing the main reflecting mirror 112 and the sub reflecting mirror 50 to the discharge lamp 90, but any method can be adopted. For example, the discharge lamp 90 and the main reflecting mirror 112 may be independently fixed to a case of the projector (not illustrated). The sub reflecting mirror 50 is the same.

1-2. Circuit Configuration of a Projector Related to this Embodiment

Figure 3:
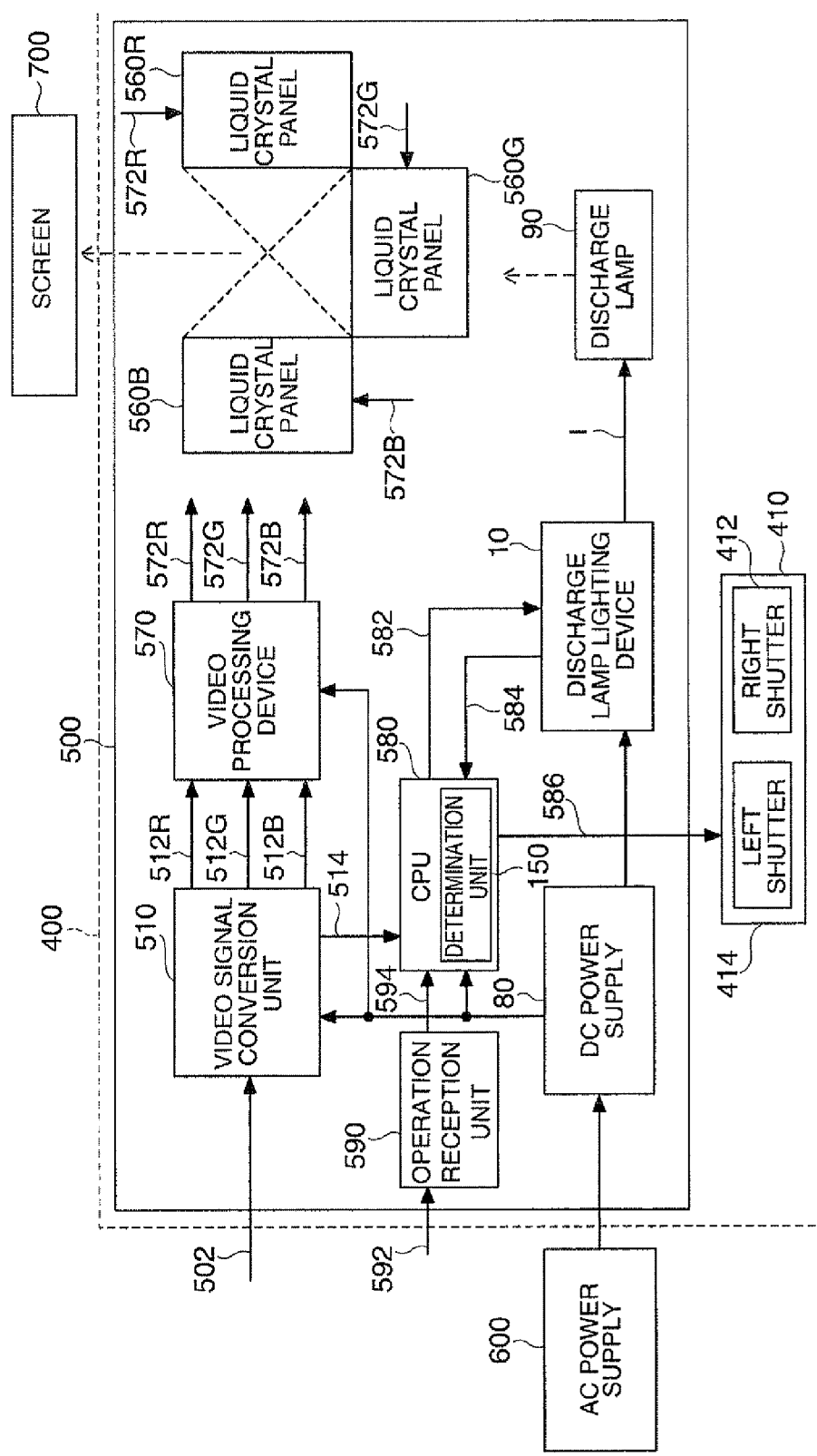
FIG. 3 is a diagram illustrating an example of a circuit configuration of a projector related to an embodiment of the invention.

FIG. 3 is a diagram illustrating an example of a circuit configuration of a projector 500 related to this embodiment. In addition to the optical system as described above, the projector 500 may include a video signal conversion unit 510, a DC power supply device 80, a discharge lamp lighting device 10, a discharge lamp 90, liquid crystal panels 560R, 560G, and 560B, a video processing device 570, a CPU (Central Processing Unit) 580, and an operation reception unit 590. Further, it is also possible to configure a projector system 400 that includes a projector 500 and active shutter glasses 410.

The video signal conversion unit 510 generates video signals 512R, 512G, and 512B by converting the video signal 502 (luminance-chrominance signal or analog RGB signal) input from outside into a digital RGB signal having a predetermined word length, and supplies the generated video signals 512R, 512G, and 512B to the video processing device 570. Further, the video signal conversion unit 510 may output information on existence/nonexistence of wirings for inputting the video signal 502 or information on existence/nonexistence of the video signal 502 to the CPU 580 through a communication signal 514.

The video processing device 570 processes three video signals 512R, 512G, and 512B, and supplies driving signals 572R, 572G, and 572B for driving the liquid crystal panels 560R, 560G, and 560B to the liquid crystal panels 560R, 560G, and 560B. An image is projected onto a screen 700 by the optical system as described above using FIG. 1 on the basis of the driving signals 572R, 572G, and 572B input to the liquid crystal panels 560R, 560G, and 560B.

The DC power supply device 80 converts a DC voltage that is supplied from an external AC power supply 600 into a constant DC voltage, and supplies the DC voltage to the video signal conversion unit 510 provided on the secondary side of a transformer (not illustrated, but included in the DC power supply device 80), the video processing device 570, and the discharge lamp lighting device 10 provided on the primary side of the transformer.

The discharge lamp lighting device 10 generates a high voltage between electrodes of the discharge lamp 90 during starting, forms a discharge path through dielectric breakdown, and then supplies a driving current I for maintaining the discharge of the discharge lamp 90.

The liquid crystal panels 560R, 560G, and 560B modulate luminance of colored lights that are incident to the respective liquid crystal panels through the optical system as described above, on the basis of the respective driving signals 572R, 572G, and 572B.

The operation reception unit 590 receives an operation 592 for the projector 500, and outputs information on the operation 592 to the CPU 580 through the communication signal 594. The operation reception unit 590 may be configured to include diverse known constituent elements such as buttons, levers, switches, and the like. Further, the operation reception unit 590 may receive the operation 592 through known wired communication or wireless communication.

The CUP 580 controls the operation that is performed from the start of the light-on of the projector to the light-off. For example, the CPU 580 may output a light-on command or a light-off command to the discharge lamp lighting device 10 through the communication signal 582. Further, the CPU 580 may receive light-on information that indicates the light-on state of the discharge lamp 90 from the discharge lamp lighting device 10 through the communication signal 584. Further, the CPU 580 may receive information on the operation 592, which has been received through the operation reception unit 590, through the communication signal 594.

Further, the CPU 580 may function as a determination unit 150 that determines an operating mode of the projector 500. In this embodiment, the projector 500 has plural operating modes in which maximum values of the driving power of the discharge lamp 90 are different from one another. For example, the operating modes may be set in a manner that a first mode is a three-dimensional mode in which the projector 500 projects a three-dimensional image, a second mode is a typical mode in which the projector 500 projects a two-dimensional image with the rated power of the discharge lamp 90, and a third mode is a low-power mode in which the projector 500 projects the two-dimensional image with about 60% of the rated power of the discharge lamp 90.

The determination unit 150, for example, may set the operating mode to the first mode in the case where the video signal 502 corresponds to a three-dimensional image on the basis of the communication signal 514, may set the operating mode to the third mode if the operation reception unit 590 receives the operation for setting a low-power operating mode of the projector 500 as the operation 592 on the basis of the communication signal 594, or may set the operating mode to the second mode in other cases.

The determination unit 150 may output the operating mode information that is information on the determined operating mode to the discharge lamp lighting device 10 through the communication signal 582.

Further, the CPU 580 may output a control signal 586 for controlling active shutter glasses 410 in synchronization with the image signal 502 on the basis of a synchronization signal 514 to the active shutter glasses 410 through wired or wireless communication means.

The active shutter glasses 410 may include a right shutter 412 and a left shutter 414. The right shutter 412 and the left shutter 414 are controlled to be opened/closed on the basis of the control signal 586. In the case where a user wears the active shutter glasses 410, the right shutter 412 may be closed to intercept the visual field of the right eye side. Further, in the case where a user wears the active shutter glasses 410, the left shutter 414 may be closed to intercept the visual field of the left eye side. The right shutter 412 and the left shutter 414, for example, may be configured as liquid crystal shutters.

1-3. Configuration of a Discharge Lamp Lighting Device in this Embodiment

Figure 4:
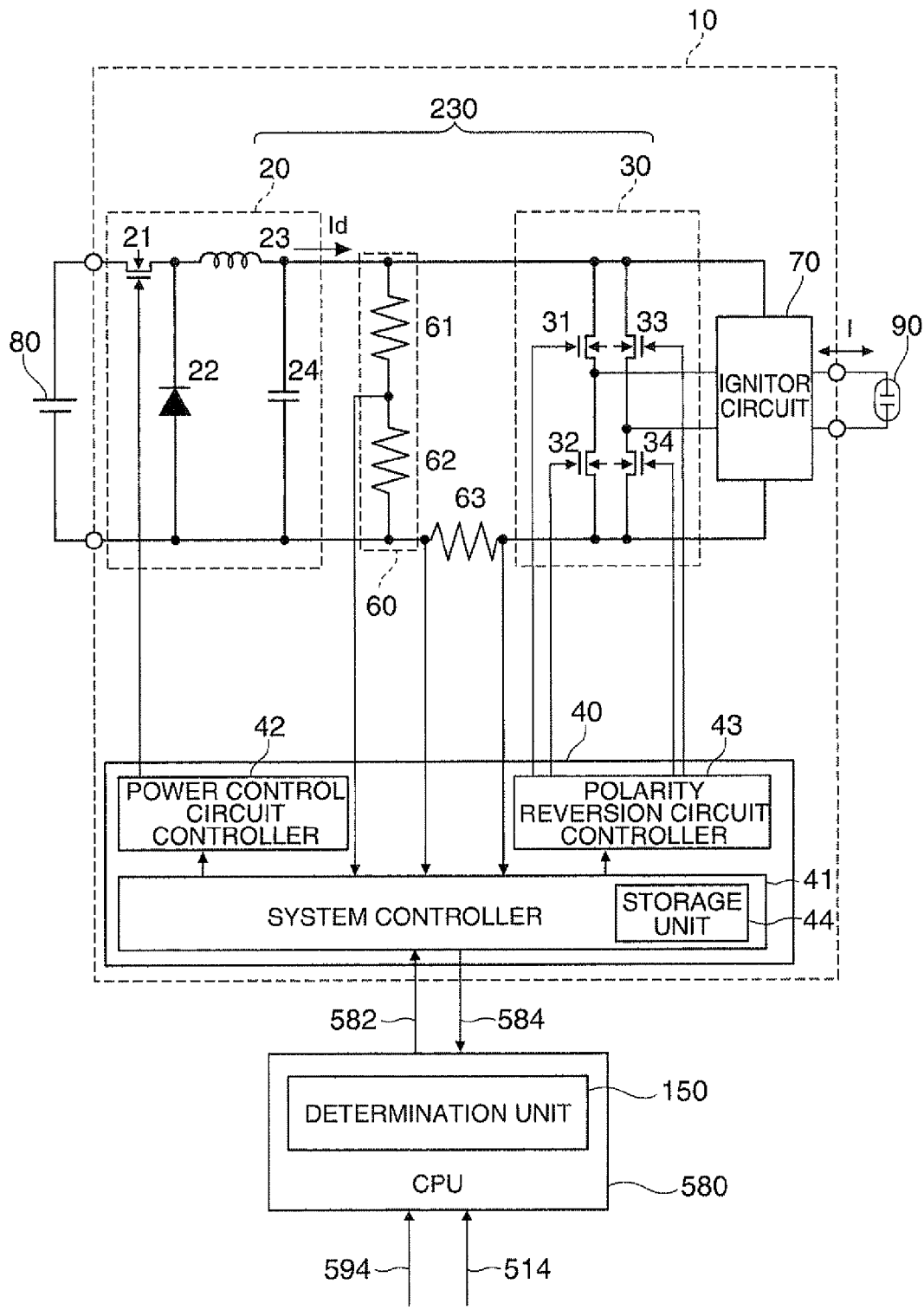
FIG. 4 is a diagram illustrating an example of a circuit configuration of a discharge lamp lighting device.

FIG. 4 is a diagram illustrating an example of a circuit configuration of a discharge lamp lighting device 10.

The discharge lamp lighting device 10 includes a power control circuit 20. The power control circuit 20 generates a driving power that is supplied to the discharge lamp 90. In this embodiment, the power control circuit 20 is composed of a down chopper circuit that receives the DC power 80 as its input, performs step-down of the input voltage, and outputs a DC current Id.

The power control circuit 20 may include a switch element 21, a diode 22, a coil 23, and a capacitor 24. The switch element 21, for example, may be composed of a transistor. In this embodiment, one end of the switch element 21 is connected to a voltage regulation side of the DC power 80, and the other end thereof is connected to a cathode terminal of the diode 22 and one end of the coil 23. Further, one end of the capacitor 24 is connected to the other end of the coil 23, and the other end of the capacitor 24 is connected to an anode terminal of the diode 22 and a negative voltage side of the DC power 80. A power control signal from a control unit 40 (to be described later) is input to a control terminal of the switch element 21 to control on/off operation of the switch element 21. The power control signal, for example, may be a PWM (Pulse Width Modulation) control signal.

Here, if the switch element 21 is turned on, current flows through the coil 23, and energy is accumulated on the coil 23. Thereafter, if the switch element 21 is turned off, the energy accumulated on the coil 23 is discharged from a path that passes through the capacitor 24 and the diode 22. As a result, a DC current Id occurs according to the ratio of time when the switch element 21 is turned on.

The discharge lamp lighting device 10 includes a polarity reversal circuit 30. The polarity reversal circuit 30 receives the DC current Id output from the power control circuit 20, generates and outputs a driving current I, which may be a DC current that continues for a controlled time or an AC current having a certain frequency, through the polarity reversal in a predetermined timing. In this embodiment, the polarity reversal circuit 30 is composed of an inverter bridge circuit (full-bridge circuit).

The polarity reversal circuit 30, for example, includes a first switch element 31, a second switch element 32, a third switch element 33, and a fourth switch element 34, which are composed of transistors and the like, and is configured through parallel connection of the first switch element 31 and the second switch element 32, which are connected in series, and the third switch element 33 and the fourth switch element 34, which are connected in series. Polarity reversal control signals from the control unit 40 are input to control terminals of the first switch element 31, the second switch element 32, the third switch element 33, and the fourth switch element 34, and on/off operations of the first switch element 31, the second switch element 32, the third switch element 33, and the fourth switch element 34 are controlled on the basis of the polarity reversal control signals.

The polarity reversal circuit 30 alternately reverses the polarity of the DC current Id that is output from the power control circuit 20 through alternate repetition of on/off operations of the first switch element 31 and the fourth switch element 34, and the second switch element 32 and the third switch element 33, generates and outputs the driving current I, which may be a DC current that continues for a controlled time or an AC current having a controlled frequency, from a common connection point of the first switch element 31 and the second switch element 32 and a common connection point of the third switch element 33 and the fourth switch element 34.

That is, the polarity reversal circuit 30 performs control operation so that the second switch element 32 and the third switch element 33 are turned off when the first switch element 31 and the fourth switch element 34 are in an on state, while the second switch element 32 and the third switch element 33 are turned on when the first switch element 31 and the fourth switch element 34 are in an off state. Accordingly, when the first switch element 31 and the fourth switch element 34 are in an on state, the driving current I is generated which flows in the order of one end of the capacitor 24, the first switch element 31, the discharge lamp 90, and the fourth switch element 34. Further, when the second switch element 32 and the third switch element 33 are in an on state, the driving current I is generated which flows in the order of one end of the capacitor 24, the third switch element 33, the discharge lamp 90, and the second switch element 32.

In this embodiment, the power control circuit 20 and the polarity reversal circuit 30 correspond to a discharge lamp driving unit 230. That is, the discharge lamp driving unit 230 supplies a driving power to the discharge lamp 90 through supply of the driving current I to the discharge lamp 90 to drive the discharge lamp 90.

The discharge lamp lighting device 10 includes the control unit 40. The control unit 40 has plural operating modes in which the maximum values of the driving power are different from one another, and controls the discharge lamp driving unit 230 on the basis of the operating mode. In an example illustrated in FIG. 4, the control unit 40 receives the operating mode information, which is information on the operating mode determined by the determination unit 150 that is a part of the CPU 580, through the communication signal 582, and controls the discharge lamp driving unit 230 on the basis of the received operating mode information.

Further, in an example illustrated in FIG. 4, the control unit 40 controls the driving power that is supplied to the discharge lamp 90, a retention time when the driving current I continues with the same polarity, a current value and a frequency of the driving current I, and the like, through control of the power control circuit 20 and the polarity reversal circuit 30. The control unit 40 performs the polarity reversal control for controlling the retention time when the driving current I continues with the same polarity, the frequency of the driving current I, and the like, in the polarity reversal timing of the driving current I, with respect to the polarity reversal circuit 30. Further, the control unit 40 performs the control of the driving power that is supplied to the discharge lamp 90 through control of the current value of the output DC current Id with respect to the power control circuit 20.

Although the configuration of the control unit 40 is not specifically limited, in this embodiment, the control unit 40 includes a system controller 41, a power control circuit controller 42, and a polarity reversal circuit controller 43. Further, the control unit 40 may be composed of a semiconductor integrated circuit as a part or as a whole.

The system controller 41 controls the power control circuit 20 and the polarity reversal circuit 30 through control of the power control circuit controller 42 and the polarity reversal circuit controller 43. The system controller 41 may control the power control circuit controller 42 and the polarity reversal circuit controller 43 on the basis of a driving voltage V1a that is detected by a voltage detection unit 60 installed inside the discharge lamp lighting device 10 to be described later and the driving current I.

In this embodiment, the system controller 41 includes a storage unit 44. Further, the storage unit 44 may be installed independently of the system controller 41.

The system controller 41 may control the power control circuit 20 and the polarity reversal circuit 30 on the basis of information stored in the storage unit 44. In the storage unit 44, for example, information on driving parameters, such as the retention time when the driving current I continues with the same polarity, current value of the driving current I, frequency, waveform, and modulated pattern.

The power control circuit controller 42 controls the power control circuit 20 through outputting of the power control signal to the power control circuit 20 on the basis of the control signal from the system controller 41.

The polarity reversal circuit controller 43 controls the polarity reversal circuit 30 through outputting of the polarity reversal control signal to the polarity reversal circuit 30 on the basis of the control signal from the system controller 41.

Figure 5:
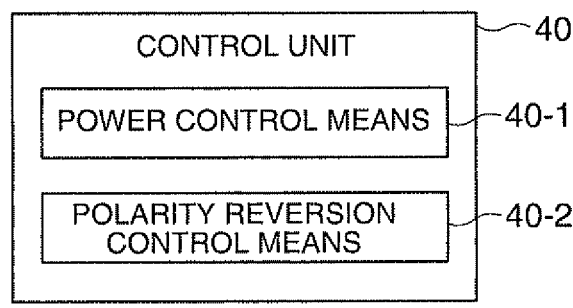
FIG. 5 is a diagram illustrating another configuration example of a control unit.

Further, although the control unit 40 can be implemented by a dedicated circuit and can perform the above-described control or various types of controls of processes to be described later, for example, it may function as a computer in which a CPU (Central Processing Unit) executes a control program stored in the storage unit 44 or the like, and perform various types of controls of such processes. FIG. 5 is a diagram illustrating another configuration example of the control unit 40. As illustrated in FIG. 5, the control unit 40 may be configured to function as a power control means 40-1 for controlling the power control circuit 20 and a polarity reversal control means 40-2 for controlling the polarity reversal circuit 30 through the control program.

Further, in an example illustrated in FIG. 4, although the control unit 40 is configured as a part of the discharge lamp lighting device 10, it may be configured so that the CUP 580 takes charge of a part or the whole of the functions of the control unit 40.

The discharge lamp lighting device 10 may include an operation detection unit. The operation detection unit, for example, may include a voltage detection unit 60 detecting the driving voltage V1a of the discharge lamp 90 and outputting the driving voltage information or a current detection unit detecting the driving current I and outputting the driving current information. In this embodiment, the voltage detection unit 60 includes first and second resistors 61 and 62, and the current detection unit includes a third resistor 63.

In this embodiment, the voltage detection unit 60 corresponds to the state detection unit in the invention. That is, the state detection unit (voltage detection unit 60) detects the driving voltage V1*a* as a value that indicates the degree of the deterioration state of the discharge lamp 90.

In this embodiment, the voltage detection unit 60 detects the driving voltage V1*a* through a voltage that is divided by the first resistor 61 and the second resistor 62 which are connected in series to each other and in parallel to the discharge lamp 90. Further, in this embodiment, the current detection unit detects the driving current I through a voltage that is generated through the third resistor 63 which is connected in series to the discharge lamp 90.

The discharge lamp lighting device 10 may include an igniter circuit 70. This igniter circuit 70 operates only when the discharge lamp 90 starts its light-on, and supplies a high voltage (that is higher than the voltage during a typical turn-on state of the discharge light 90), which is necessary to form a discharge path through the dielectric breakdown between the electrodes (the first electrode 92 and the second electrode 93) of the discharge lamp 90 when the discharge lamp 90 starts its light-on, between the electrodes (the first electrode 92 and the second electrode 93) of the discharge lamp 90. In this embodiment, the igniter circuit 70 is connected in parallel to the discharge lamp 90.

Figure 6A:
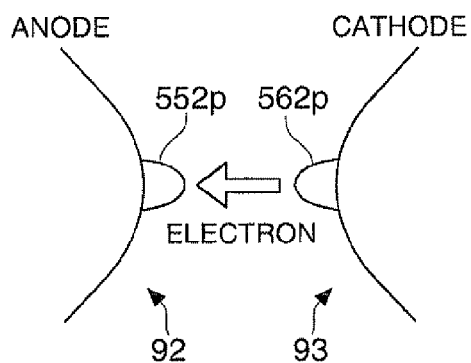
FIGS. 6A to 6D are diagrams illustrating a relationship between a polarity of a driving current that is supplied to a discharge lamp and a temperature of an electrode.

1-4. Relationship Between the Polarity of the Driving Current and the Temperature of the Electrode FIGS. 6A to 6D are diagrams illustrating a relationship between the polarity of a driving current I that is supplied to a discharge lamp 90 and the temperature of an electrode. FIGS. 6A and 6E illustrate operation states of a first electrode 92 and a second electrode 93. In the drawings, front end portions of the first electrode 92 and the second electrode 93 are illustrated. At the front ends of the first electrode 92 and the second electrode 93, protrusions 552*p* and 562*p* are installed. The discharge occurring between the first electrode 92 and the second electrode 93 mainly occurs between the protrusion 552*p* and the protrusion 562*p*. In an example illustrated in FIGS. 6A and 6B, in comparison to a case where no protrusion is installed, the movement of the discharge position (arc position) on the first electrode 92 and the second electrode 93 can be suppressed. However, such protrusions may be omitted.

FIG. 6A illustrates a first polarity state P1 in which the first electrode 92 operates as an anode and the second electrode 93 operates as a cathode. In the first polarity state P1, due to the discharge, electrons move from the second electrode 93 (cathode) to the first electrode 92 (anode). Electrons are emitted from the cathode (second electrode 93). The electrons emitted from the cathode (second electrode 93) collide with the front end of the anode (first electrode 92). Due to this collision, heat is generated, and thus the temperature of the front end (protrusion 552*p*) of the anode (first electrode 92) is heightened.

Figure 6B:
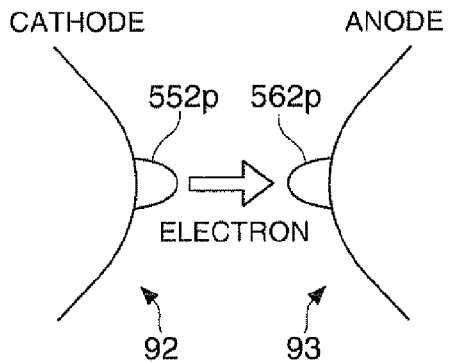

FIG. 6B illustrates a second polarity state P2 in which the first electrode 92 operates as a cathode and the second electrode 93 operates as an anode. In the second polarity state P2, on the contrary to the first polarity state P1, electrons move from the first electrode 92 to the second electrode 93. As a result, the temperature of the front end (protrusion 562*p*) of the second electrode 93 is heightened.

As described above, the temperature of the anode is liable to be heightened in comparison to the cathode. Here, it may cause various defects that the temperature of one-side electrode is continuously maintained in a high state in comparison to the other-side electrode. For example, if the front end of the high-temperature electrode is excessively melted, unintended electrode deformation may occur. As a result, the arc length may deviate from a proper value. Further, if the melting of the front end of the low-temperature electrode is insufficient, slight irregularities occurring at the front end may not be melted but remain. As a result, an arc jump may occur (the arc position is moved without being stabilized).

Figure 6C:
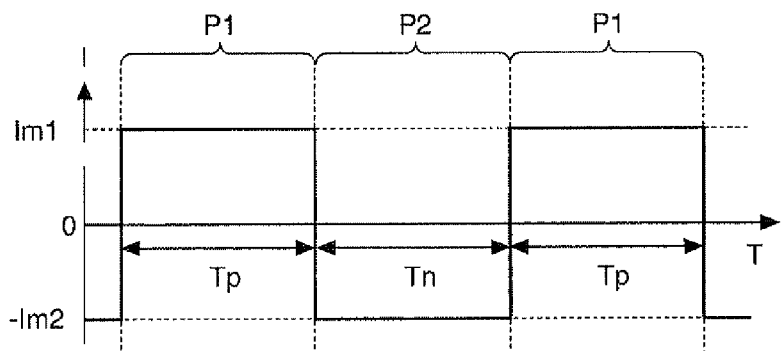

As a technique of suppressing such defects, an AC drive that supplies an AC current to the discharge lamp 90, which repeatedly alternates the polarities of the respective electrodes as the driving current I, is usable. FIG. 6C is a timing chart illustrating an example of the driving current I that is supplied to the discharge lamp 90 (see FIG. 2). A horizontal axis represents time T, and a vertical axis represents a current value of the driving current I. The driving current I represents current that flows through the discharge lamp 90. A positive (+) value indicates the first polarity state P1, and a negative (−) value indicates the second polarity state 92. In an example illustrated in FIG. 6C, a square wave alternating current is used as the driving current I. Further, in the example illustrated in FIG. 6C, the first polarity state P1 and the second polarity state P2 are alternately repeated. Here, a first polarity period Tp represents time when the first polarity state P1 continues, and a second polarity period Tn represents time when the second polarity state P2 continues. Further, in the example illustrated in FIG. 6C, an average current value of the first polarity period Tp is Im1, and an average current value of the second polarity period Tn is −Im2. Further, the frequency of the driving current I that is suitable for the driving of the discharge lamp 90 can be experimentally determined to match the characteristic of the discharge lamp 90 (for example, a value in the range of 30 Hz to 1 kHz is adopted). Other values Im1, −Im2, Tp, and Tn can be experimentally determined in the same manner.

Figure 6D:
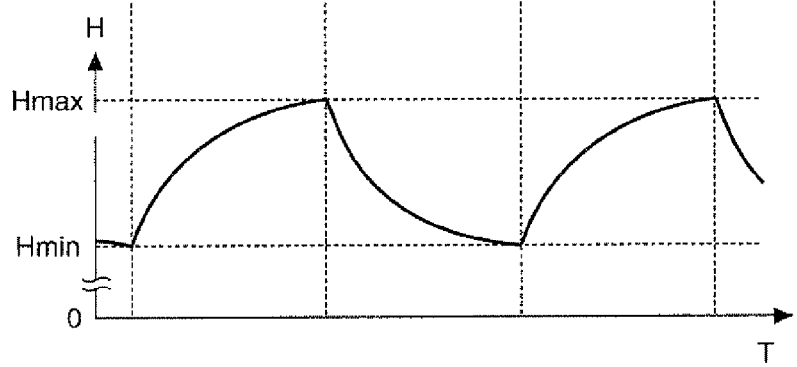

FIG. 6D is a timing chart illustrating the temperature change of the first electrode 92. The horizontal axis represents time T, and the vertical axis represents temperature H. In the first polarity state P1, the temperature H of the first electrode 92 is heightened, and in the second polarity state P2, the temperature H of the first electrode 92 is lowered. Further, since the first polarity state P1 and the second polarity state P2 are repeated, the temperature H is periodically changed between the minimum value Hmin and the maximum value Hmax. Further, although not illustrated, the temperature of the second electrode 93 is changed to have an opposite phase to the temperature H of the first electrode 92. That is, in the first polarity state P1, the temperature of the second electrode 93 is lowered, and in the second polarity state P2, the temperature of the second electrode 93 is heightened.

In the first polarity state P1, the front end of the first electrode 92 (protrusion 552*p*) is melted, and thus the front end of the first electrode 92 (protrusion 552*p*) becomes smooth. Accordingly, the movement of the discharge position on the first electrode 92 can be suppressed. Further, since the temperature of the front end of the second electrode 93 (protrusion 562*p*) is lowered, an excessive melting of the second electrode 93 (protrusion 562*p*) is suppressed. Accordingly, unintended electrode deformation can be suppressed. In the second polarity state P2, the first electrode 92 and the second electrode 93 are in opposite positions to each other. Accordingly, by repeating the two states P1 and P2, the defect can be suppressed in the first electrode 92 and the second electrode 93, respectively.

Here, if the waveform of the current I is symmetric, that is, if the waveform of the current I meets the requirement of "|Im1|=|−Im2|, Tp=Tn", the supplied power requirements are the same between the first electrode 92 and the second electrode 93. Accordingly, if the thermal conditions (easiness of temperature increase or decrease) of the first electrode 92 and the second electrode 93 are the same, it is assumed that the difference in temperature between the first electrode 92 and the second electrode 93 becomes smaller.

Further, if the electrode is heated too much over a wide range (arc spot (hot spot on the electrode surface that accompanies arc discharge) becomes larger), the shape of the electrode collapses due to excessive melting. By contrast, if the electrode is too cold (arc spot becomes smaller), the front end of the electrode is not sufficiently melted, and thus the front end is not returned to smooth, that is, the front end of the electrode is liable to be deformed.

Figure 7A:
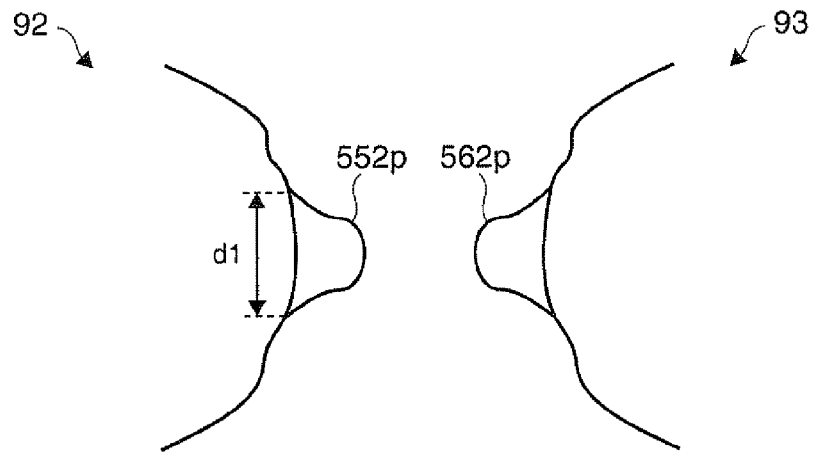
FIGS. 7A to 7C are diagrams illustrating a relationship between a maximum value of a driving power and a shape of an electrode of a discharge lamp.
Figure 7B:
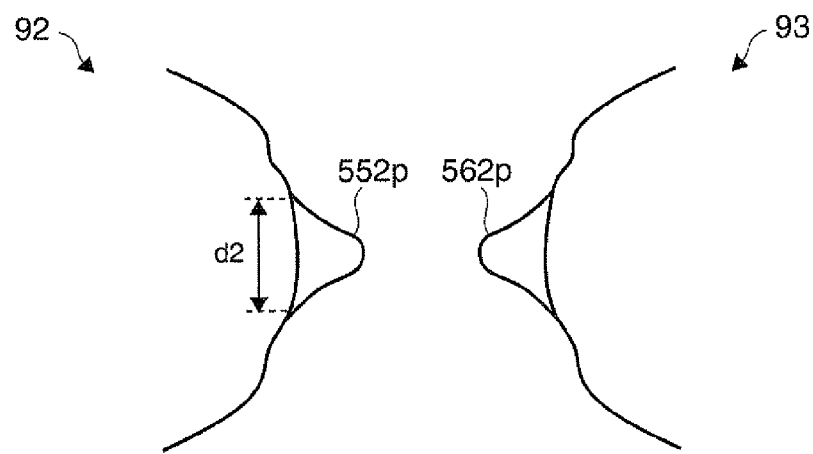
Figure 7C:
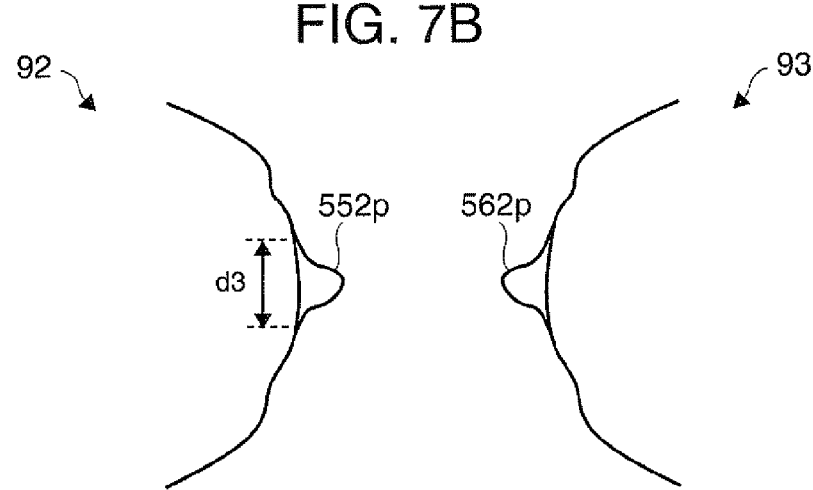

1-5. Relationship Between the Maximum Value of a Driving Power and the Shape of an Electrode of a Discharge Lamp FIGS. 7A to 7C are diagrams illustrating the relationship between the maximum value of a driving current and the shape of an electrode of a discharge lamp. FIGS. 7A to 7C illustrate the shape of the front end portions of the first electrode 92 and the second electrode 93. FIG. 7A illustrates a case where the maximum value of the driving power is Wm1, FIG. 7B illustrates a case where the maximum value of the driving power is Wm2, and FIG. 7C illustrates a case where the maximum value of the driving power is Wm3. Here, it is assumed that the size relationship of Wm1>Wm2>Wm3 is satisfied.

As the maximum value of the driving power becomes larger, the arc spot becomes larger. Accordingly, as the maximum value of the driving power becomes larger, the area of the base of the protrusion 552p or the protrusion 562p becomes larger. The cross-sectional shapes of the protrusion 552p and the protrusion 562p on a plane that is perpendicular to the direction from the first electrode 92 to the second electrode 93 are substantially circular. If it is assumed that the diameter of the base of the protrusion 552p in FIG. 7A is d1, the diameter of the base of the protrusion 552p in FIG. 7B is d2, and the diameter of the base of the protrusion 552p in FIG. 7C is d3, the size relationship among them becomes d1>d2>d3.

1-6. Control Examples in Respective Operation Modes

Examples of a projector 500 related to this embodiment, which has three operating modes in which maximum values of the driving power are different from one another, will be described. In the examples described hereinafter, a first mode is a three-dimensional mode in which the projector 500 projects a three-dimensional image, a second mode is a typical mode in which the projector 500 projects a two-dimensional image with the rated power of the discharge lamp 90, and a third mode is a low-power mode in which the projector 500 projects the two-dimensional image with about 60% of the rated power of the discharge lamp 90.

1-6-1. Control Example in the First Mode

In the first mode, the projector 500 related to this embodiment switches and alternately outputs a first image (right-eye image) and a second image (left-eye image) in a predetermined switching timing. A period that is inserted in temporally neighboring switching timings starts in a first period and ends in a second period, and the control unit 40 controls the discharge lamp driving unit 230 so that the driving power becomes relatively low in the first period, and the driving power becomes relatively high in the second period. That is, the first mode is a mode in which the first period corresponding to a relatively low driving power and the second period corresponding to a relatively high driving power are repeated.

Figure 8:
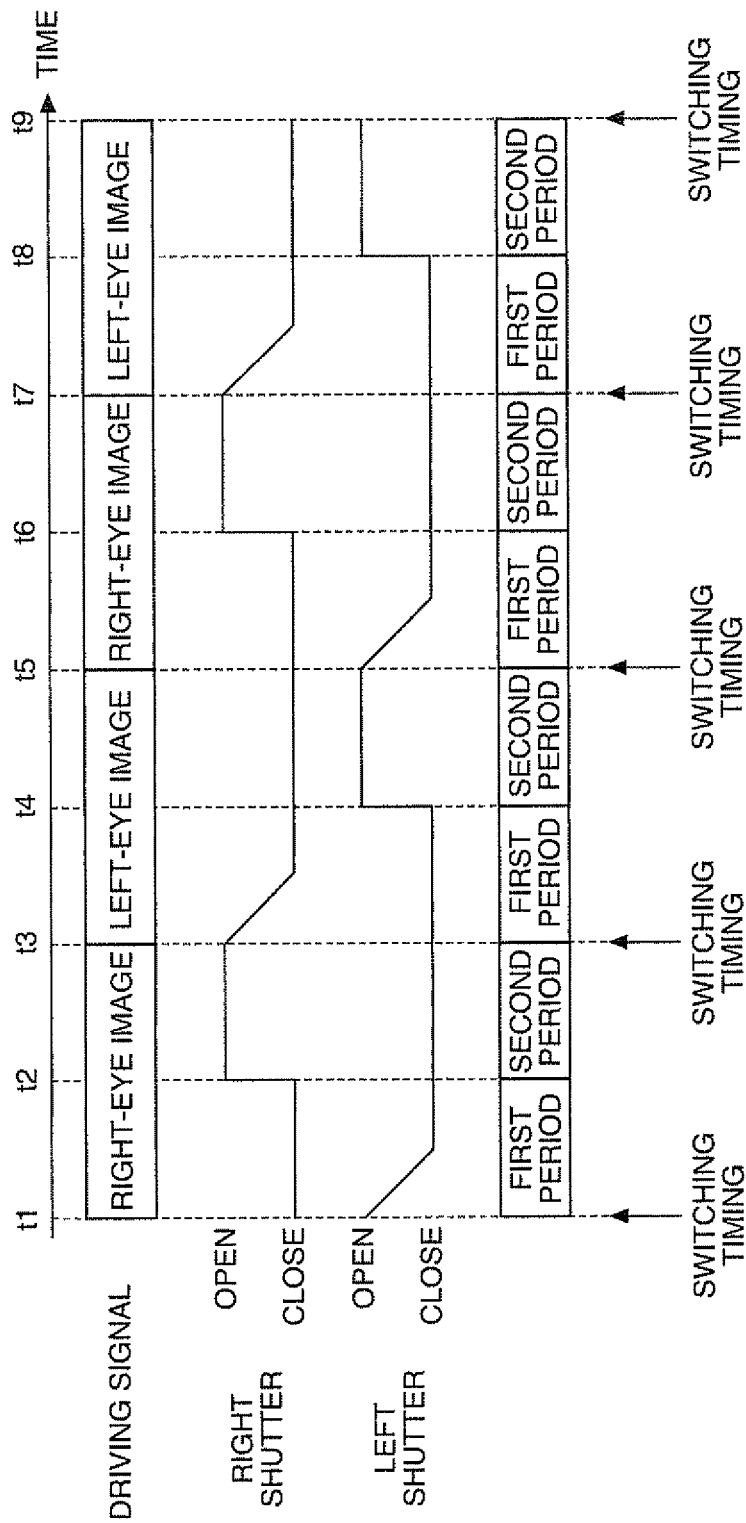
FIG. 8 is a diagram illustrating a first period, a second period, and switching timing.

FIG. 8 is a diagram illustrating a first period, a second period, and switching timing. FIG. 8 illustrates, from top to bottom, contents of driving signals 572R, 572G, and 572B, the open/close state of a right shutter 412, the open/close state of a left shutter 414, the first period and the second period, and the temporal relationship between switching timings. The horizontal axis in FIG. 8 represents time. Hereinafter, an example of enabling an observer to view a displayed image as a stereoscopic image through processing of the first image and the second image as the left-eye image and the right eye image, respectively, will be described.

In an example illustrated in FIG. 8, the driving signals 572R, 572G, and 572B are driving signals that correspond to the right-eye image as the first image between time t1 and time t3, the left-eye image as the second image between time t3 and time t5, the right-eye image as the first image between time t5 and time t7, and the left-eye image as the second image between time t7 and time t9. Accordingly, in the example illustrated in FIG. 8, the projector 500 switches and alternately outputs the right-eye image as the first image and the left-eye image as the second image in consideration of the time t1, the time t3, the time t5, the time t7, and the time t9 as the switching timings.

A period that is inserted in temporally neighboring switching timings starts in the first period and ends in the second period. In the example illustrated in FIG. 8, for example, the period inserted between the time t1 and the time t3 as the switching timing starts in the first period between the time t1 and the time t2 and ends in the second period between the time t2 and the time t3. The period inserted between the time t3 and the time t5 as the switching timing, the period inserted between the time t5 and the time t7 as the switching timing, and the period inserted between the time t7 and the time t9 as the switching timing are in the same manner. Further, although the first period and the second period have the same length in the example illustrated in FIG. 8, the length of the first period and the length of the second period may be set appropriately if necessary. Further, a third period may be present between the first period and the second period. In the third period, a control that is different from the control of the driving current I in the first period and the second period may be performed to be described later.

The right shutter 412 is in an open state in at least a part of the period in which the driving signals 572R, 572G, and 572B that correspond to the right-eye image as the first image are input to the liquid crystal panels 560R, 560G, and 560B. In the example illustrated in FIG. 8, the right shutter 412 is in a closed state between the time t1 and the time t2, and is in an open state between the time t2 and the time t3. Further, in the example illustrated in FIG. 8, in the period in which the driving signals 572R, 572G, and 572B that correspond to the left-eye image as the second image are input to the liquid crystal panels 560R, 560G, and 560B, the right shutter 412 starts closing at the time t3, finishes closing between the time t3 and the time t4, and is in a closed state between the time t4 and the time t5. The change of the switching condition of the right shutter 412 between the time t5 and the time t9 is the same as the change of the switching condition thereof between the time t1 and the time t5.

The left shutter 414 is in an open state in at least a part of the period in which the driving signals 572R, 572G, and 572B that correspond to the left-eye image as the second image are input to the liquid crystal panels 560R, 560G, and 560B. In the example illustrated in FIG. 8, the left shutter 414 is in a closed state between the time t3 and the time t4, and is in an open state between the time t4 and the time t5. Further, in the example illustrated in. FIG. 8, in the period in which the driving signals 572R, 572G, and 572B that correspond to the right-eye image as the first image are input to the liquid crystal panels 560R, 560G, and 560B, the left shutter 414 starts closing at the time t1, finishes closing between the time t1 and the time t2, and is in a closed state between the time t2 and the time t3. The change of the switching condition of the left shutter 414 between the time t5 and the time t9 is the same as the change of the switching condition thereof between the time t1 and the time t5.

In the example illustrated in FIG. 8, in the period in which the driving signals 572R, 572G, and 572B that correspond to the right-eye image as the first image are input to the liquid crystal panels 560R, 560G, and 560B, the period in which the right shutter 412 is closed corresponds to the first period, and the period in which the right shutter 412 is open corresponds to the second period. Further, in the example illustrated in FIG. 8, in the period in which the driving signals 572R, 572G, and 572B that correspond to the left-eye image as the second image are input to the liquid crystal panels 560R, 560G, and 560B, the period in which the left shutter 414 is closed corresponds to the first period, and the period in which the left shutter 414 is open corresponds to the second period. Further, in the example illustrated in FIG. 8, a period in which both the right shutter 412 and the left shutter 414 are closed exists in the first period.

Figure 9:
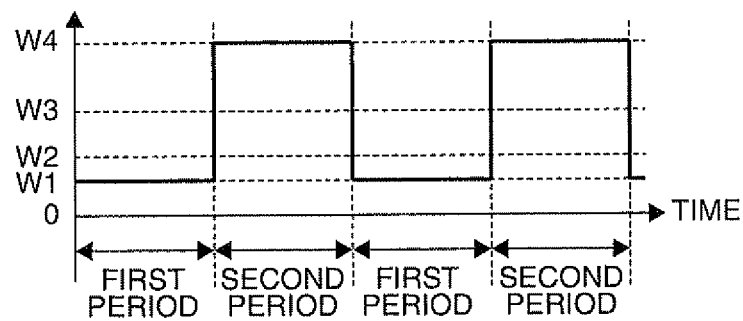
FIG. 9 is a timing chart illustrating a control example of a driving power in a first mode.

FIG. 9 is a timing chart illustrating a control example of a driving power in a first mode. The horizontal axis represents time, and the vertical axis represents a driving power that is supplied to the discharge lamp 90. In the following description, it is assumed that the size relationship among the driving powers W1 to W4 is W1<W2<W3<W4.

In an example illustrated in FIG. 9, the driving power that is supplied to the discharge lamp 90 in the first mode becomes the driving power W1 in the first period, and becomes the driving power W4 in the second period. The value of the driving power may be experimentally determined based on the specification of the discharge lamp 90. In the example illustrated in FIG. 9, the driving power W1 is 77 W, and the driving power W4 is 383 W. Accordingly, the maximum value Wm1 of the driving power in the first mode becomes 383 W that corresponds to the driving power W4. Further in the example illustrated in FIG. 9, the first period and the second period have the same length. Accordingly, an average value Wa1 of the driving powers through the first period and the second period in the first mode becomes 230 W.

Figure 10A:
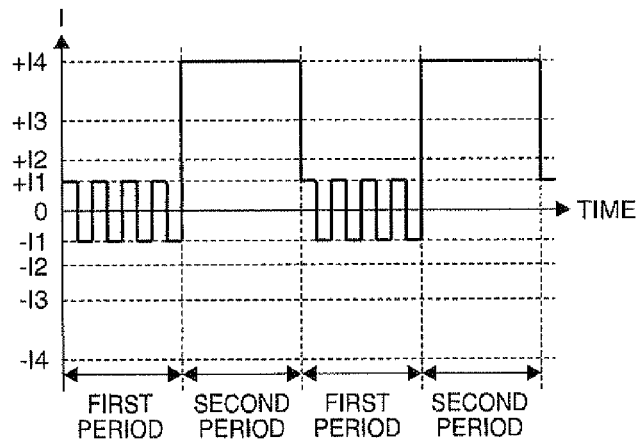
FIGS. 10A to 10C are timing charts illustrating a control example of a driving current in a first mode.
Figure 10B:
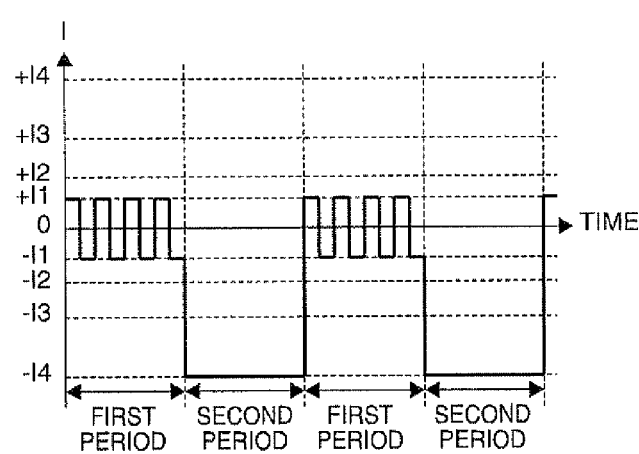
Figure 10C:
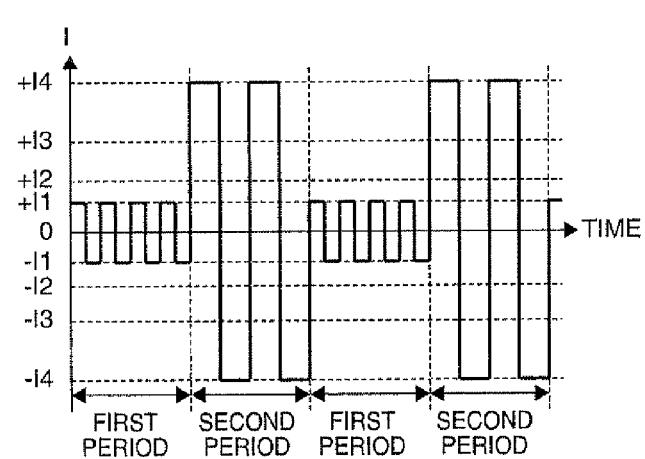

FIGS. 10A to 10C are timing charts illustrating a control example of a driving current I in a first mode. The horizontal axis represents time, and the vertical axis represents a driving power I. In FIGS. 10A to 10C, the driving current I when the first electrode 92 becomes the anode represents a positive (+) value, and the driving current I when the second electrode 93 becomes the anode represents a negative (−) value. In the following description, the size relationship among the absolute values I1 to I4 of the driving current I becomes I1<I2<I3<I4. Further, if the driving voltage V1a of the discharge lamp 90 is considered to be a constant value, the driving power that is supplied to the discharge lamp 90 is in proportion to the driving current I.

In an example illustrated in FIG. 10A, the driving current I that is supplied to the discharge lamp 90 in the first mode becomes four cycles of alternating current in which the current value is in the range of −I1 to +I1 and the frequency is 480 Hz in the first period, and becomes ½ cycle of alternating current in which the current value is +I4 and the frequency is 60 Hz in the second period.

In an example illustrated in FIG. 10B, the driving current I that is supplied to the discharge lamp 90 in the first mode becomes four cycles of alternating current in which the current value is in the range of −I1 to +I1 and the frequency is 480 Hz in the first period, and becomes ½ cycle of alternating current in which the current value is −I4 and the frequency is 60 Hz in the second period.

In an example illustrated in FIG. 10C, the driving current I that is supplied to the discharge lamp 90 in the first mode becomes four cycles of alternating current in which the current value is in the range of −I1 to +I1 and the frequency is 480 Hz in the first period, and becomes two cycles of alternating current in which the current value is in the range of −I4 to +I4 and the frequency is 240 Hz in the second period.

The driving current I in the first mode, for example, may be anyone of the examples illustrated in FIGS. 10A to 10C or a combination of two or more of the examples illustrated in FIGS. 10A to 10C. For example, the driving currents I in the first mode, which are illustrated in FIG. 10A, FIG. 10C, FIG. 10B, and FIG. 10C, respectively, form a group, and are controlled to appear in turn.

1-6-2. Control Example in the Second Mode

Figure 11A:
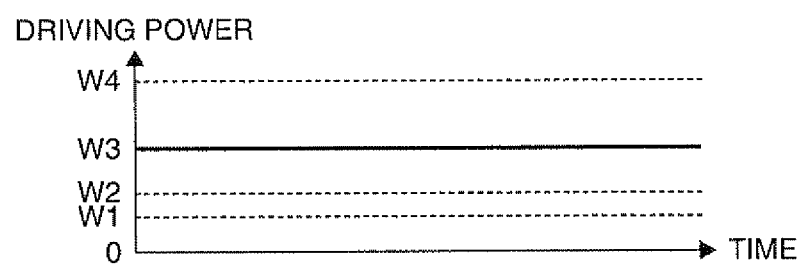
FIG. 11A is a timing chart illustrating a control example of a driving power in a second mode.

FIG. 11A is a timing chart illustrating a control example of a driving current in a second mode. The horizontal axis represents time, and the vertical axis represents a driving power that is supplied to the discharge lamp 90.

In an example illustrated in FIG. 11A, the driving power that is supplied to the discharge lamp 90 in the second mode becomes a constant value of the driving power W3. The value of the driving power can be experimentally determined on the basis of the specification of the discharge lamp 90. In the example illustrated in FIG. 11A, the driving power W3 becomes 230 W. Accordingly, the maximum value Wm2 of the driving power in the second mode becomes 230 W that corresponds to the driving power W3. Further, an average value Wa1 of the driving power in the second mode becomes 230 W.

Figure 11B:
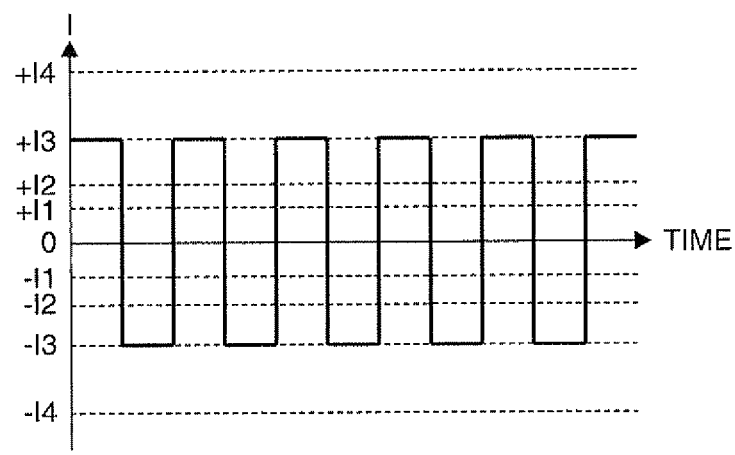
FIG. 11B is a timing chart illustrating a control example of a driving current in a second mode.

FIG. 11B is a timing chart illustrating a control example of a driving current I in a second mode. The horizontal axis represents time, and the vertical axis represents a driving power I. In FIG. 11B, the driving current I when the first electrode 92 becomes the anode represents a positive (+) value, and the driving current I when the second electrode 93 becomes the anode represents a negative (−) value.

In an example illustrated in FIG. 11B, the driving current I that is supplied to the discharge lamp 90 in the second mode becomes alternating current in which the current value is in the range of −I3 to +I3 and the frequency is 80 Hz.

1-6-3. Control Example in the Third Mode

Figure 12A:
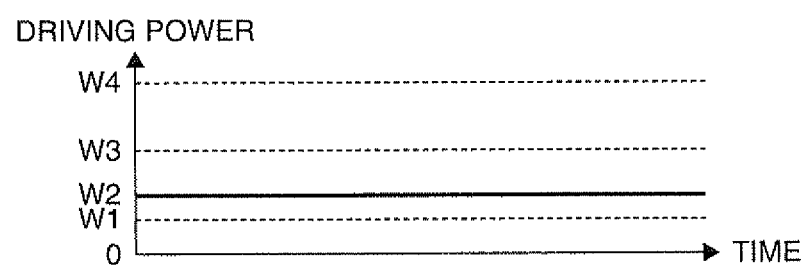
FIG. 12A is a timing chart illustrating a control example of a driving power in a third mode.

FIG. 12A is a timing chart illustrating a control example of a driving current in a third mode. The horizontal axis represents time, and the vertical axis represents a driving power that is supplied to the discharge lamp 90.

In an example illustrated in FIG. 12A, the driving power that is supplied to the discharge lamp 90 in the third mode becomes a constant value of the driving power W2. The value of the driving power can be experimentally determined on the basis of the specification of the discharge lamp 90. In the example illustrated in FIG. 12A, the driving power W2 becomes 140 W. Accordingly, the maximum value Wm3 of the driving power in the third mode becomes 140 W that corresponds to the driving power W2. Further, an average value Wa3 of the driving power in the third mode becomes 140 W.

Figure 12B:
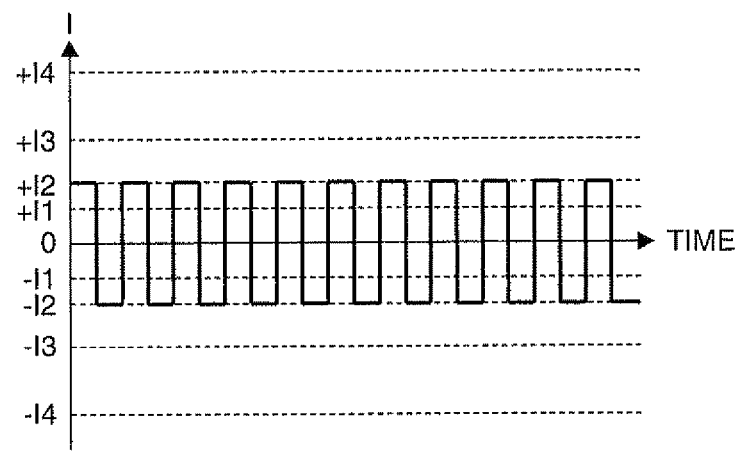
FIG. 12B is a timing chart illustrating a control example of a driving current in a third mode.

FIG. 12B is a timing chart illustrating a control example of a driving current I in a third mode. The horizontal axis represents time, and the vertical axis represents a driving power I. In FIG. 12B, the driving current I when the first electrode 92 becomes the anode represents a positive (+) value, and the driving current I when the second electrode 93 becomes the anode represents a negative (−) value.

In an example illustrated in FIG. 12B, the driving current I that is supplied to the discharge lamp 90 in the second mode becomes alternating current in which the current value is in the range of −I3 to +I3 and the frequency is 80 Hz.

1-7. Control Example in a Transition Period

In this embodiment, the control unit 40 switches the operating mode through a transition period and controls the discharge lamp driving unit 230 so that an average value of the frequency of the driving current I in the former half of the transition period becomes larger than an average value of the frequency of the driving current I in the latter half of the transition period.

FIGS. 13A to 13F are diagrams illustrating the transition period. In an example illustrated in FIG. 13A, the control unit 40 switches the operating mode from the first mode to the second mode through the transition period T12. In an example illustrated in FIG. 13B, the control unit 40 switches the operating mode from the first mode to the third mode through the transition period T13. In an example illustrated in FIG. 13C, the control unit 40 switches the operating mode from the second mode to the third mode through the transition period T23. In an example illustrated in FIG. 13D, the control unit 40 switches the operating mode from the third mode to the second mode through the transition period T32. In an example illustrated in FIG. 13E, the control unit 40 switches the operating mode from the second mode to the first mode through the transition period T21. In an example illustrated in FIG. 13F, the control unit 40 switches the operating mode from the third mode to the first mode through the transition period T31.

Figure 14:
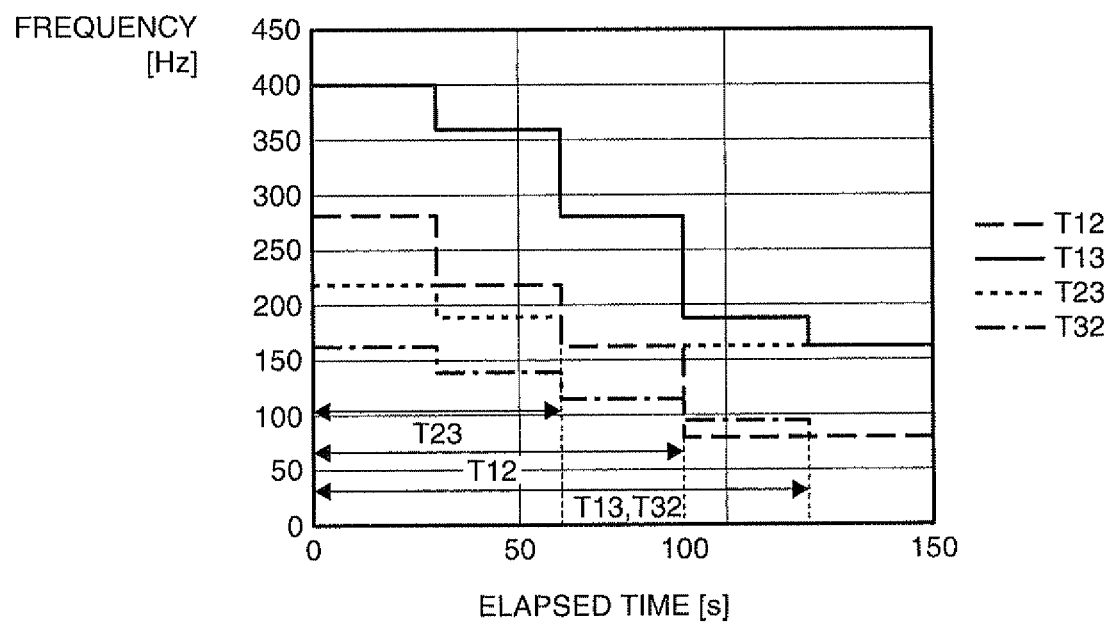
FIG. 14 is a graph illustrating a control example in a transition period T12, a transition period T13, a transition period T23, and a transition period T32.

FIG. 14 is a graph illustrating a control example in a transition period T12, a transition period T13, a transition period T23, and a transition period T32. The horizontal axis represents an elapsed time from the start of the transition period, and the vertical axis represents the frequency of the driving current I. Further, in FIG. 14, the transition period T12 is indicated by a dashed line, the transition period T13 is indicated by a solid line, the transition period T23 is indicated by a dotted line, and the transition period T32 is indicated by a dashed-dotted line.

In an example illustrated in FIG. 14, the average value of the frequency of the driving current I in the former half of the transition period T12 becomes 250 Hz, and the average value of the frequency of the driving current I in the latter half of the transition period T12 becomes 192.5 Hz. That is, the control unit 40 controls the discharge lamp driving unit 230 so that the average value of the frequency of the driving current I in the former half of the transition period T12 becomes larger than the average value of the frequency of the driving current I in the latter half of the transition period T12.

Further, the average value of the frequency of the driving current I just after the transition period T12 (that is, the second mode) is 80 Hz. Accordingly, both the average value of the frequency of the driving current I in the former half of the transition period T12 and the average value of the frequency of the driving current I in the latter half of the transition period T12 become larger than the average value of the frequency of the driving current I just after the transition period T12.

In the example illustrated in FIG. 14, the average value of the frequency of the driving current I in the former half of the transition period T13 becomes 380 Hz, and the average value of the frequency of the driving current I in the latter half of the transition period T13 becomes 235 Hz. That is, the control unit 40 controls the discharge lamp driving unit 230 so that the average value of the frequency of the driving current I in the former half of the transition period T13 becomes larger than the average value of the frequency of the driving current I in the latter half of the transition period T13.

Further, the average value of the frequency of the driving current I just after the transition period T13 (that is, the third mode) is 165 Hz. Accordingly, both the average value of the frequency of the driving current I in the former half of the transition period T13 and the average value of the frequency of the driving current I in the latter half of the transition period T13 become larger than the average value of the frequency of the driving current I just after the transition period T13.

In the example illustrated in FIG. 14, the average value of the frequency of the driving current I in the former half of the transition period T23 becomes 220 Hz, and the average value of the frequency of the driving current I in the latter half of the transition period T23 becomes 190 Hz. That is, the control unit 40 controls the discharge lamp driving unit 230 so that the average value of the frequency of the driving current I in the former half of the transition period T23 becomes larger than the average value of the frequency of the driving current I in the latter half of the transition period T23.

Further, the average value of the frequency of the driving current I just after the transition period T23 (that is, the third mode) is 165 Hz. Accordingly, both the average value of the frequency of the driving current I in the former half of the transition period T23 and the average value of the frequency of the driving current I in the latter half of the transition period T23 become larger than the average value of the frequency of the driving current I just after the transition period T23.

In the example illustrated in FIG. 14, the average value of the frequency of the driving current I in the former half of the transition period T32 becomes 152.5 Hz, and the average value of the frequency of the driving current I in the latter half of the transition period T32 becomes 105 Hz. That is, the control unit 40 controls the discharge lamp driving unit 230 so that the average value of the frequency of the driving current I in the former half of the transition period T32 becomes larger than the average value of the frequency of the driving current I in the latter half of the transition period T32.

Further, the average value of the frequency of the driving current I just after the transition period T32 (that is, the second mode) is 80 Hz. Accordingly, both the average value of the frequency of the driving current I in the former half of the transition period T32 and the average value of the frequency of the driving current I in the latter half of the transition period T32 become larger than the average value of the frequency of the driving current I just after the transition period T32.

In this embodiment, if the operating mode is switched, the maximum value of the driving power is changed. In this embodiment, since the control unit 40 switches the operating mode through the transition period and controls the discharge lamp driving unit 230 so that the average value of the frequency of the driving current I in the former half of the transition period becomes larger than the average value of the frequency of the driving current I in the latter half of the transition period, the position of the origin of discharge on the electrode of the discharge lamp 90 can be early stabilized in the case where the maximum value of the driving power becomes smaller (which corresponds to the FIGS. 13A, 13B, and 13C as described above) through the switching of the operating mode. Further, in the case where the maximum value of the driving power becomes larger (which corresponds to FIG. 13D as described above) through the switching of the operating mode, a loss of the protrusion that becomes the origin of the discharge on the electrode of the discharge lamp 90 can be suppressed. Accordingly, a projector that can suppress the occurrence of flicker can be realized.

The control unit 40 may control the discharge lamp driving unit 230 so that the minimum value of the frequency of the driving current I in the former half of the transition period becomes larger than the minimum value of the frequency of the driving current I in the latter half of the transition period.

In an example illustrated in FIG. 14, the minimum value of the frequency of the driving current I in the former half of the transition period T12 becomes 220 Hz, and the minimum value of the frequency of the driving current I in the latter half of the transition period T12 becomes 165 Hz. That is, the control unit 40 controls the discharge lamp driving unit 230 so that the minimum value of the frequency of the driving current I in the former half of the transition period T12 becomes larger than the minimum value of the frequency of the driving current I in the latter half of the transition period T12.

Further, in the example illustrated in FIG. 14, the minimum value of the frequency of the driving current I in the former half of the transition period T13 becomes 360 Hz, and the minimum value of the frequency of the driving current I in the latter half of the transition period T13 becomes 190 Hz. That is, the control unit 40 controls the discharge lamp driving unit 230 so that the minimum value of the frequency of the driving current I in the former half of the transition period T13 becomes larger than the minimum value of the frequency of the driving current I in the latter half of the transition period T13.

Further, in the example illustrated in FIG. 14, the minimum value of the frequency of the driving current I in the former half of the transition period T23 becomes 220 Hz, and the minimum value of the frequency of the driving current I in the latter half of the transition period T23 becomes 190 Hz. That is, the control unit 40 controls the discharge lamp driving unit 230 so that the minimum value of the frequency of the driving current I in the former half of the transition period T23 becomes larger than the minimum value of the frequency of the driving current I in the latter half of the transition period T23.

Further, in the example illustrated in FIG. 14, the minimum value of the frequency of the driving current I in the former half of the transition period T32 becomes 140 Hz, and the minimum value of the frequency of the driving current I in the latter half of the transition period T32 becomes 95 Hz. That is, the control unit 40 controls the discharge lamp driving unit 230 so that the minimum value of the frequency of the driving current I in the former half of the transition period T32 becomes larger than the minimum value of the frequency of the driving current I in the latter half of the transition period T32.

Since the control unit 40 controls the discharge lamp driving unit 230 so that the minimum value of the frequency of the driving current I in the former half of the transition period becomes larger than the minimum value of the frequency of the driving current I in the latter half of the transition period, the position of the origin of discharge on the electrode of the discharge lamp 90 can be earlier stabilized in the case where the maximum value of the driving power becomes smaller (which corresponds to the FIGS. 13A, 13B, and 13C as described above) through the switching of the operating mode. Further, in the case where the maximum value of the driving power becomes larger (which corresponds to FIG. 13D as described above) through the switching of the operating mode, a loss of the protrusion that becomes the origin of the discharge on the electrode of the discharge lamp 90 can be further suppressed. Accordingly, a projector that can further suppress the occurrence of flicker can be realized.

In the case where the operating mode after the transition period is a mode that repeats the first period in which the driving power is relatively low and the second period in which the driving power is relatively high, the control unit 40 may control the discharge lamp driving unit 230 so that the minimum value of the frequency of the driving current I in the second period in the former half of the transition period becomes larger than the minimum value of the frequency of the driving current I in the second period in the latter half of the transition period.

Figure 13A:
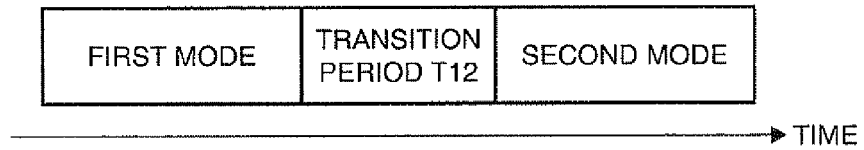
FIGS. 13A to 13F are diagrams illustrating a transition period.
Figure 13B:
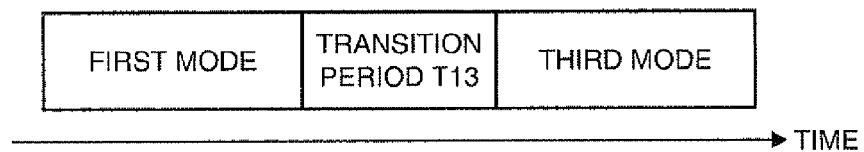
Figure 13C:
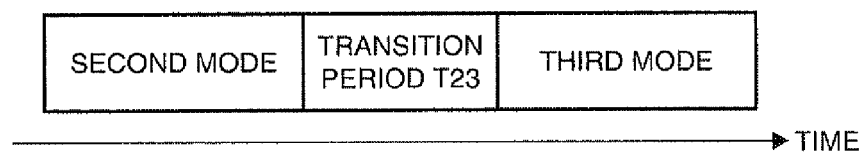
Figure 13D:
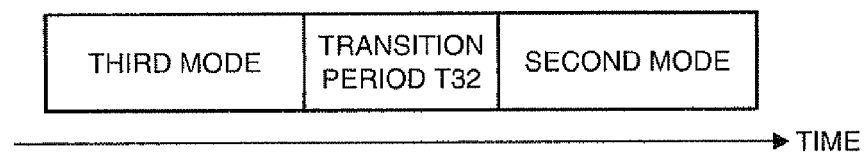
Figure 13E:
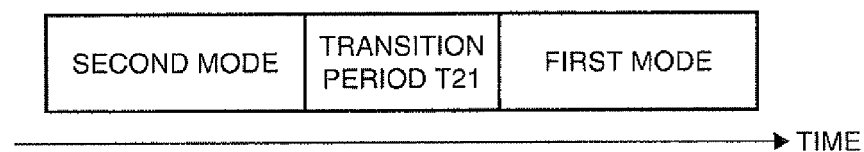
Figure 13F:
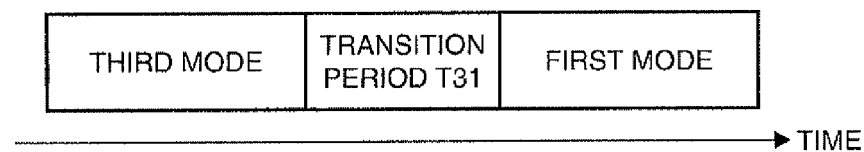

In this embodiment, the first mode is a mode that repeats the first period in which the driving power is relatively low and the second period in which the driving power is relatively high. Accordingly, the case as illustrated in FIGS. 13E and 13F will be described hereinafter.

FIGS. 15A to 15E are timing charts illustrating control examples of the driving current I in the transition period T21 and the transition period T31. The horizontal axis represents time, and the vertical axis represents the driving current I.

Figure 15A:
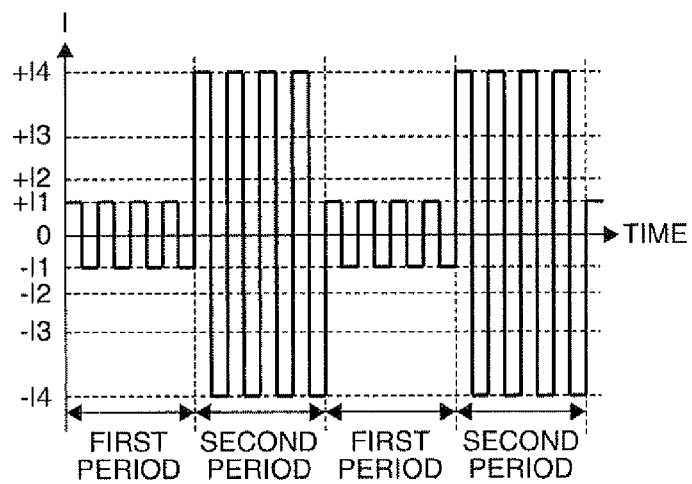
FIG. 15A is a timing chart illustrating a control example of a driving current in a transition period T21 and a transition period T31.

In an example illustrated in FIG. 15A, the driving current I becomes four cycles of alternating current in which the current value is in the range of −I1 to +I1 and the frequency is 480 Hz in the first period, and becomes four cycles of alternating current in which the current value is in the range of −I4 to +I4 and the frequency is 480 Hz in the second period.

Figure 15B:
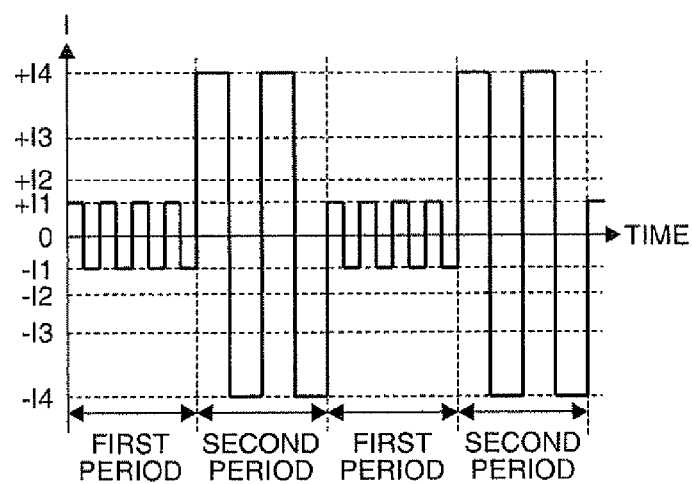
FIG. 15B is a timing chart illustrating a control example of a driving current in a transition period T21 and a transition period T31.

In an example illustrated in FIG. 15B, the driving current I becomes four cycles of alternating current in which the current value is in the range of −I1 to +I1 and the frequency is 480 Hz in the first period, and becomes two cycles of alternating current in which the current value is in the range of −I4 to +I4 and the frequency is 240 Hz in the second period.

Figure 15C:
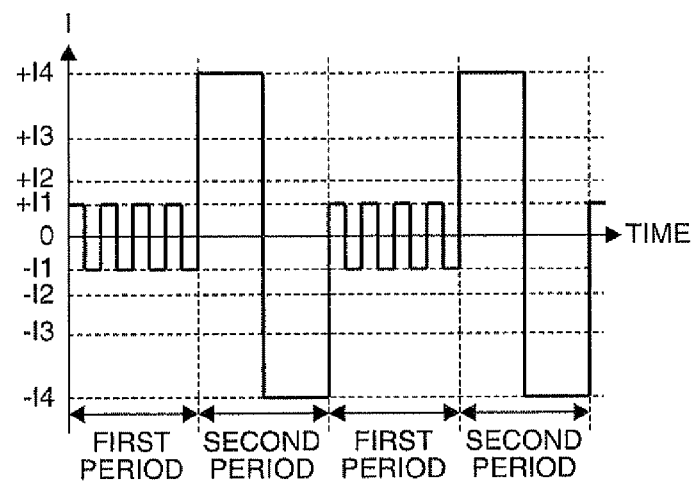
FIG. 15C is a timing chart illustrating a control example of a driving current in a transition period T21 and a transition period T31.

In an example illustrated in FIG. 15C, the driving current I becomes four cycles of alternating current in which the current value is in the range of −I1 to +I1 and the frequency is 480 Hz in the first period, and becomes one cycle of alternating current in which the current value is in the range of −I4 to +I4 and the frequency is 120 Hz in the second period.

Figure 15D:
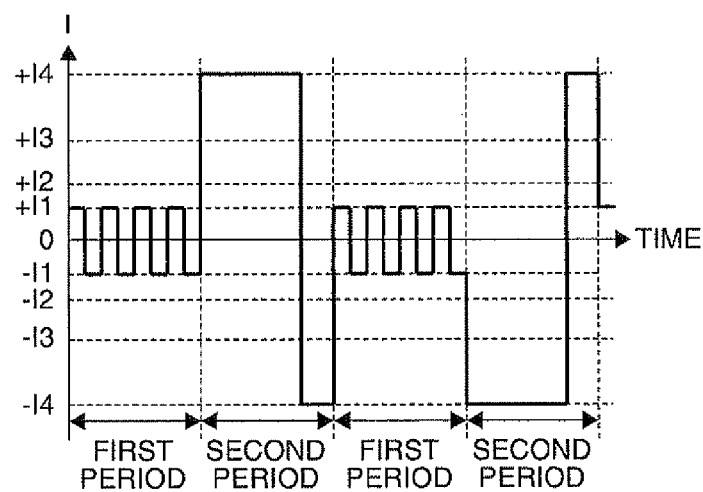
FIG. 15D is a timing chart illustrating a control example of a driving current in a transition period T21 and a transition period T31.

In an example illustrated in FIG. 15D, the driving current I becomes four cycles of alternating current in which the current value is in the range of −I1 to +I1 and the frequency is 480 Hz in the first period, and becomes ⅔ cycle of alternating current in which the current value is in the range of −I4 to +I4 and the frequency is 80 Hz in the second period.

Figure 15E:
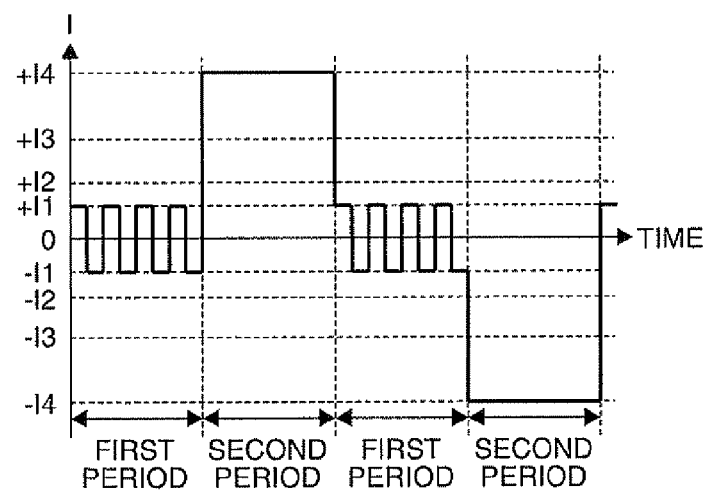
FIG. 15E is a timing chart illustrating a control example of a driving current in a transition period T21 and a transition period T31.

In an example illustrated in FIG. 15E, the driving current I becomes four cycles of alternating current in which the current value is in the range of −I1, to +I1 and the frequency is 480 Hz in the first period, and becomes ½0 cycle of alternating current in which the current value is in the range of −I4 to +I4 and the frequency is 60 Hz in the second period.

Figure 16A:
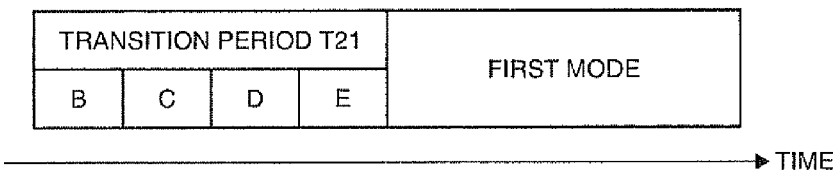
FIG. 16A is a diagram illustrating a control example of a transition period T21.
Figure 16B:
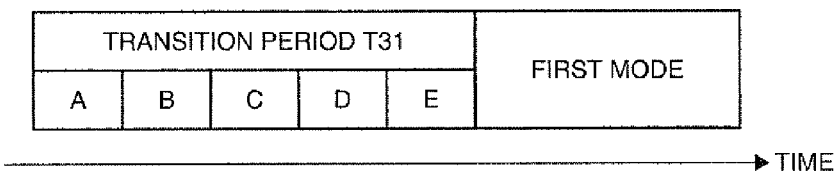
FIG. 16B is a diagram illustrating a control example of a transition period T31.

FIG. 16A is a diagram illustrating a control example of the transition period T21, and FIG. 16B is a diagram illustrating a control example of the transition period T31. In FIGS. 16A and 16B, the horizontal axis represents time. Further, in FIGS. 16A and 16B, the controls of the driving current I in "A", "B", "C", "D", and "E" are the controls that correspond to FIGS. 15A, 15B, 15C, 15D, and 15E, respectively.

In an example illustrated in FIG. 16A, in the transition period T21, the control unit 40 controls the discharge lamp driving unit 230 to chronologically supply the driving currents I that correspond to FIGS. 15B, 15C, 15D, and 15E to the discharge lamp 90. That is, the control unit 40 controls the discharge lamp driving unit 230 so that the minimum value of the frequency of the driving current I in the second period in the former half of the transition period T21 becomes larger than the minimum value of the frequency of the driving current I in the second period in the latter half of the transition period T21.

In an example illustrated in FIG. 16B, in the transition period T31, the control unit 40 controls the discharge lamp driving unit 230 to chronologically supply the driving currents I that correspond to FIGS. 15A, 15B, 15C, 15D, and 15E to the discharge lamp 90. That is, the control unit 40 controls the discharge lamp driving unit 230 so that the minimum value of the frequency of the driving current I in the second period in the former half of the transition period T31 becomes larger than the minimum value of the frequency of the driving current I in the second period in the latter half of the transition period T31.

Since the driving power is high in the second period rather than in the first period, it exerts a great influence on the electrode state of the discharge lamp 90. Accordingly, by controlling the discharge lamp driving unit 230 so that the minimum value of the frequency of the driving current I in the second period in the former half of the transition period becomes larger than the minimum value of the frequency of the driving current in the second period in the latter half of the transition period, the occurrence of flicker can be further suppressed.

The control unit 40 may control the discharge lamp driving unit 230 so that the length of the transition period becomes longer as a difference between the maximum value of the driving power in the operating mode before the transition period and the maximum value of the driving power in the operating mode after the transition period becomes larger.

In this embodiment, the maximum value of the driving power in the first mode is W4 (=383 W), the maximum value of the driving power in the second mode is W3 (=230 W), and the maximum value of the driving power in the third mode is W2 (=140 W). For example, in the case where the operating mode is changed from the operating mode in which the maximum value of the driving power is large to the operating mode in which the maximum value of the driving power is small, the operating mode is changed in the order of difference between the maximum values of the driving power, that is, from the first mode to the third mode, from the first mode to the second mode, and from the second mode to the third mode, respectively.

In an example illustrated in FIG. 14, in the case of changing from the operating mode in which the maximum value of the driving power is large to the operating mode in which the maximum value of the driving power is small, the transition periods are in the order of their length, that is, in the order of the transition period T13, the transition period T12, and the transition period T23. That is, as the difference between the maximum value of the driving power in the operating mode before the transition period and the maximum value of the driving power in the operating mode after the transition period becomes larger, the transition period is lengthened.

Further, in an example illustrated in FIGS. 16A and 16B, in the case of changing from the operating mode in which the maximum value of the driving power is small to the operating mode in which the maximum value of the driving power is large, the transition periods are in the order of their length, that is, in the order of the transition period T31 and the transition period T21. That is, as the difference between the maximum value of the driving power in the operating mode before the transition period and the maximum value of the driving power in the operating mode after the transition period becomes larger, the transition period is longer.

As the difference between the maximum value of the driving power in the operating mode before the transition period and the maximum value of the driving power in the operating mode after the transition period becomes larger, a difference between the shape of the electrode of the discharge lamp 90 which is stable and is easily driven in the operating mode before the transition period and the shape of the electrode of the discharge lamp 90 which is stable and is easily driven in the operating mode after the transition period becomes larger. Accordingly, by controlling the discharge lamp driving unit 230 so that the length of the transition period becomes longer as the difference between the maximum value of the driving power in the operating mode before the transition period and the maximum value of the driving power in the operating mode after the transition period becomes larger, and by changing the shape of the electrode gently, the occurrence of flicker can be further suppressed.

The control unit 40 may control the discharge lamp driving unit 230 so that the average value of the frequency of the driving current I in the former half of the transition period becomes larger as the difference between the maximum value of the driving power in the operating mode before the transition period and the maximum value of the driving power in the operating mode after the transition period becomes larger.

In the example illustrated in FIG. 14, in the case of changing from the operating mode in which the maximum value of the driving power is large to the operating mode in which the maximum value of the driving power is small, the transition periods are in the order of their average value of the frequency of the driving current I in the former half of the transition period, that is, in the order of the transition period T13 (380 Hz), the transition period T12 (250 Hz), and the transition period T23 (220 Hz). That is, as the difference between the maximum value of the driving power in the operating mode before the transition period and the maximum value of the driving power in the operating mode after the transition period becomes larger, the average value of the frequency of the driving current I in the former half of the transition period becomes higher.

Further, in an example illustrated in FIGS. 16A and 16B, in the case of changing from the operating mode in which the maximum value of the driving power is small to the operating mode in which the maximum value of the driving power is large, the transition periods are in the order of their average value of the frequency of the driving current I in the former half of the transition period, that is, in the order of the transition period T31 and the transition period T21. That is, as the difference between the maximum value of the driving power in the operating mode before the transition period and the maximum value of the driving power in the operating mode after the transition period becomes larger, the average value of the frequency of the driving current I in the former half of the transition period becomes higher.

As the difference between the maximum value of the driving power in the operating mode before the transition period and the maximum value of the driving power in the operating mode after the transition period becomes larger, the difference between the shape of the electrode of the discharge lamp 90 which is stable and is easily driven in the operating mode before the transition period and the shape of the electrode of the discharge lamp 90 which is stable and is easily driven in the operating mode after the transition period becomes larger. Accordingly, by controlling the discharge lamp driving unit 230 so that the average value of the frequency of the driving current I in the former half of the transition period becomes larger as the difference between the maximum value of the driving power in the operating mode before the transition period and the maximum value of the driving power in the operating mode after the transition period becomes larger, the position of the origin of the discharge on the electrode of the discharge lamp 90 can be earlier stabilized in the case where the maximum value of the driving power becomes smaller through the switching of the operating mode. Further, in the case where the maximum value of the driving power becomes larger through the switching of the operating mode, the loss of the protrusion that becomes the origin of the discharge on the electrode of the discharge lamp 90 can be further suppressed. Accordingly, a projector that can further suppress the occurrence of flicker can be realized.

2. Projector Related to a First Modified Example

Next, a projector related to the first modified example will be described. The configuration such as an optical system and circuits of the projector related to the first modified example is the same as that of the above-described projector 500. Accordingly, a detailed example of the driving current I in the first modified example will be described hereinafter.

In the first modified example, it is exemplified that the third mode repeats a period in which the frequency of the driving current I is relatively high and a period in which the frequency of the driving current I is relatively low. Further, the principle to be described hereinafter may be applied in the same manner even in the case where the second mode repeats a period in which the frequency of the driving current I is relatively high and a period in which the frequency of the driving current I is relatively low.

Further, the transition period T13 is exemplified hereinafter. Further, the principle to be described hereinafter may be applied in the same manner even in the case of the transition period T23.

Figure 17:
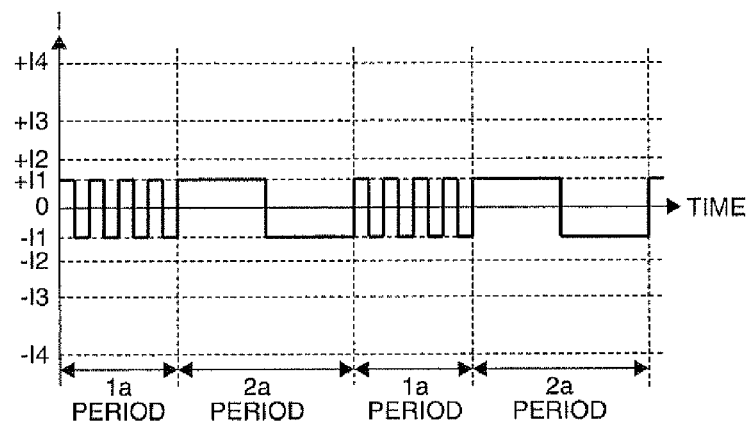
FIG. 17 is a timing chart illustrating a control example in a transition period T13 in a first modified example.

FIG. 17 is a timing chart illustrating a control example in a transition period T13 in a first modified example. The horizontal axis represents time, and the vertical axis represents the driving current I.

As illustrated in FIG. 17, the control unit 40 may control the discharge lamp driving unit 230 to repeat the 1a-th period in which the frequency of the driving current I is relatively high and the 2a-th period in which the frequency of the driving current I is relatively low in the transition period T13.

Figure 18:
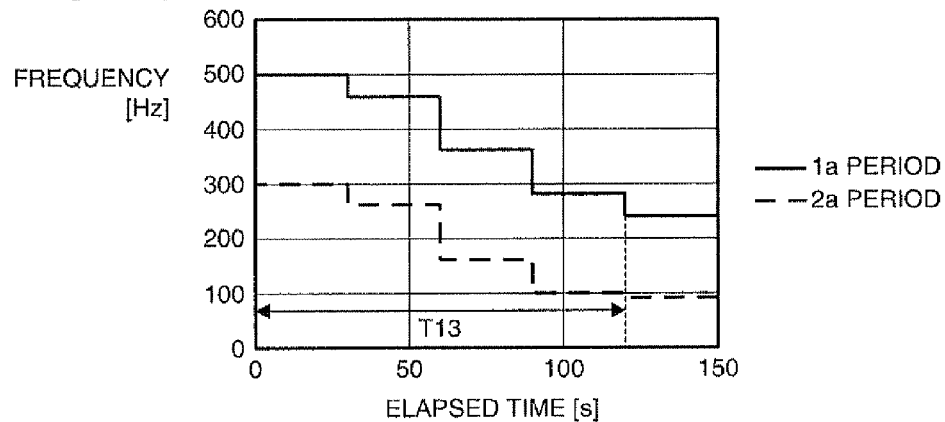
FIG. 18 is a graph illustrating a control example in a transition period T13 in the first modified example.

FIG. 18 is a graph illustrating a control example in the transition period T13 in the first modified example. The horizontal axis represents an elapsed time from the start of the transition period, and the vertical axis represents the frequency of the driving current I. In FIG. 18, the frequency of the driving current I in the 1a-th period is indicated by a solid line, and the frequency of the driving current I in the 2a-th period is indicated by a dashed line.

In an example illustrated in FIG. 18, the frequency of the driving current I in the 1a-th period is lowered by stages from 500 Hz to 280 Hz. Further, the frequency of the driving current I in the 2a-th period is lowered by stages from 300 Hz to 100 Hz. That is, the control unit 40 controls the discharge lamp driving unit 230 so that the average value of the frequency of the driving current I in the former half of the transition period T13 becomes larger than the average value of the frequency of the driving current I in the latter half of the transition period T13. Accordingly, in the same manner as the projector 500, the occurrence of flicker can be suppressed.

Further, the control unit 40 may control the discharge lamp driving unit 230 so that the ratio of time when the frequency of the driving current I in the former half of the transition period becomes the minimum value to time in the former half of the transition period becomes smaller than the ratio of time when the frequency of the driving current I in the latter half of the transition period becomes the minimum value to time in the latter half of the transition period.

Figure 19:
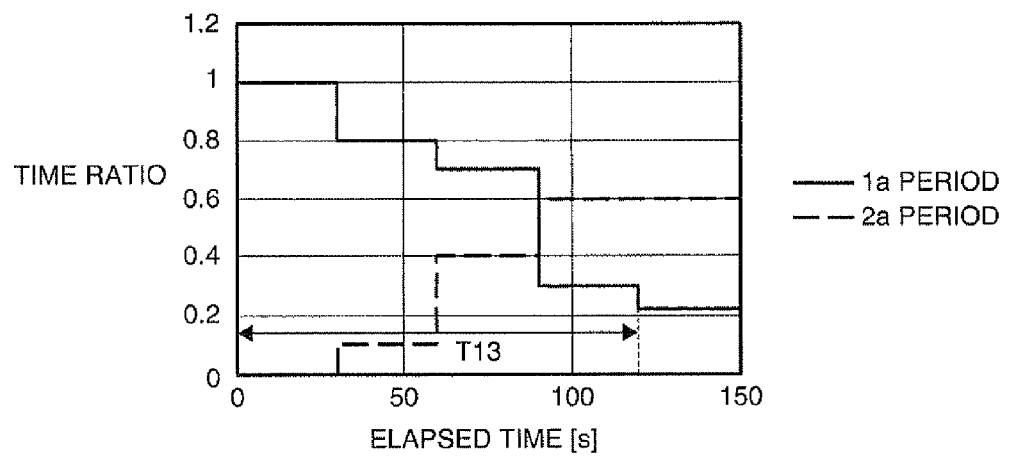
FIG. 19 is a graph illustrating another control example in a transition period T13 in the first modified example.

FIG. 19 is a graph illustrating another control example in the transition period T13 in the first modified example. The horizontal axis represents an elapsed time from the start of the transition period, and the vertical axis represents the relative time ratio between the 1a-th period and the 2a-th period. In FIG. 19, the time ratio of the lath period is indicated by a solid line, and the time ratio of the 2a-th period is indicated by a dashed line.

In an example illustrated in FIG. 19, the time ratio of the 1a-th period in the transition period T13 is lowered by stages. Further, the time ratio of the 2a-th period in the transition period T13 is heightened by stages. That is, the control unit 40 controls the discharge lamp driving unit 230 so that the ratio of the time when the frequency of the driving current I in the former half of the transition period T13 becomes the minimum value to the time in the former half of the transition period T13 becomes smaller than the ratio of the time when the frequency of the driving current I in the latter half of the transition period T13 becomes the minimum value to the time in the latter half of the transition period T13.

Even in an example illustrated in FIG. 19, in the case where the maximum value of the driving power becomes smaller through the switching of the operating mode, the position of the origin of the discharge on the electrode of the discharge lamp 90 can be early stabilized. Further, in the case where the maximum value of the driving power becomes larger through the switching of the operating mode, the loss of the protrusion that becomes the origin of the discharge on the electrode of the discharge lamp can be suppressed. Accordingly, a projector that can further suppress the occurrence of flicker can be realized.

3. Projector Related to a Second Modified Example

Next, a projector related to the second modified example will be described. The configuration such as an optical system and circuits of the projector related to the second modified example is the same as that of the above-described projector 500. Accordingly, a detailed example of the driving current I in the second modified example will be described hereinafter.

Further, the transition period T31 is exemplified hereinafter. Further, the principle to be described hereinafter may be applied in the same manner even in the case of the transition period T21.

In the case where the operating mode after the transition period is a mode that repeats the first period in which the driving power is relatively low and the second period in which the driving power is relatively high, the control unit 40 may control the discharge lamp driving unit 230 so that the ratio of time when the frequency of the driving current I in the second period in the former half of the transition period becomes the minimum value to time in the former half of the transition period becomes smaller than the ratio of time when the frequency of the driving current I in the second period in the latter half of the transition period becomes the minimum value to time in the latter half of the transition period.

Hereinafter, a case where the driving currents I in the first mode, which are illustrated in FIG. 10A, FIG. 10C, FIG. 10B, and FIG. 10C, respectively, form a group, and are controlled to appear in turn will be described as an example.

Figure 20:
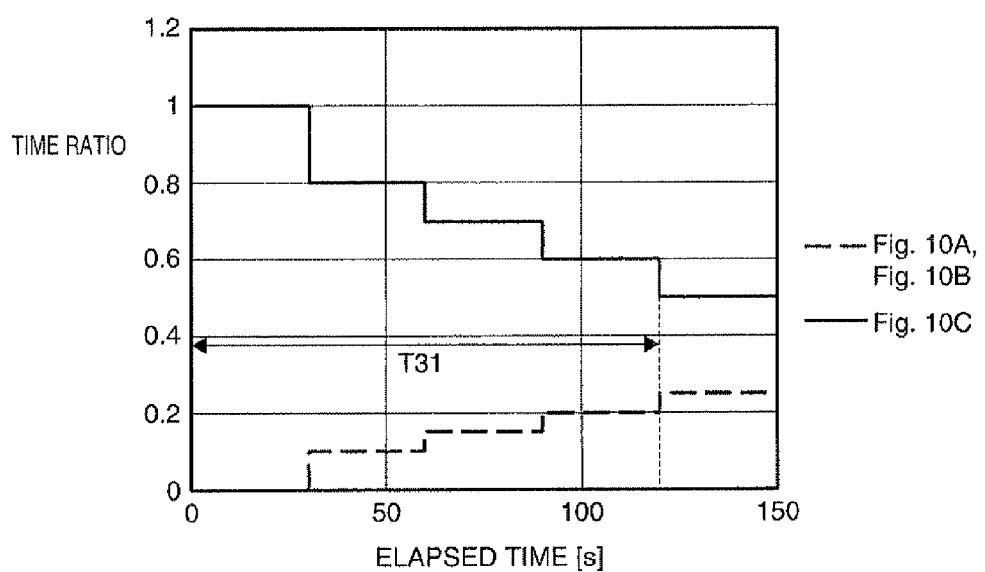
FIG. 20 is a graph illustrating a control example in a transition period T13 in a second modified example.

FIG. 20 is a graph illustrating a control example in the transition period T31 in the second modified example. The horizontal axis represents an elapsed time from the start of the transition period, and the vertical axis represents the relative time ratio between times when the driving current I is controlled as in FIGS. 10A, 10B, and 10C. In FIG. 20, the time ratio of FIGS. 10A and 10B are indicated by dashed lines, and the time ratio of FIG. 10C is indicated by a solid line.

In an example illustrated in FIG. 20, the time ratio of FIGS. 10A and 10B in the transition period T31 is heightened by stages. Further, the time ratio of FIG. 10C in the transition period T31 is lowered by stages. That is, the control unit 40 controls the discharge lamp driving unit 230 so that the ratio of the time when the frequency of the driving current I in the second period in the former half of the transition period T31 becomes the minimum value to the time in the former half of the transition period T31 becomes smaller than the ratio of the time when the frequency of the driving current I in the second period in the latter half of the transition period becomes the minimum value to the time in the latter half of the transition period T31.

Since the driving power is high in the second period rather than in the first period, it exerts a great influence on the electrode state of the discharge lamp 90. Accordingly, by controlling the discharge lamp driving unit 230 so that the ratio of the time when the frequency of the driving current I in the second period in the former half of the transition period becomes the minimum value to the time in the former half of the transition period becomes smaller than the ratio of the time when the frequency of the driving current I in the second period in the latter half of the transition period becomes the minimum value to the time in the latter half of the transition period, the occurrence of flicker can be further suppressed.

4. Projector Related to a Third Modified Example

Next, a projector related to the third modified example will be described. The configuration such as an optical system and circuits of the projector related to the third modified example is the same as that of the above-described projector 500. Accordingly, a detailed example of the driving current I in the third modified example will be described hereinafter.

The control unit 40 may control the discharge lamp driving unit 230 so that the length of the transition period becomes longer as the time when the operating mode just before the transition period continues becomes longer.

Figure 21:
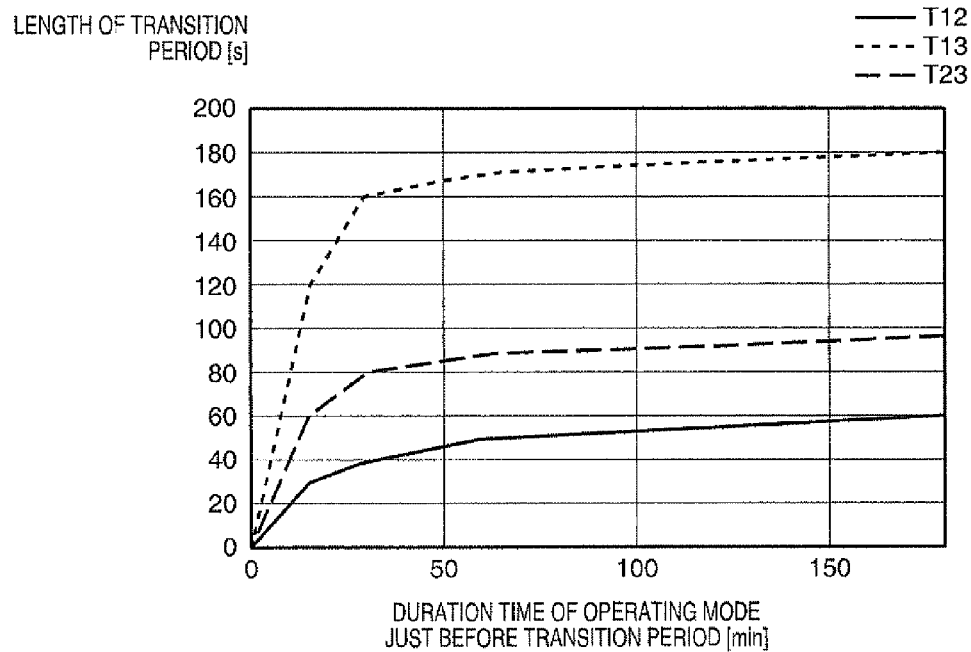
FIG. 21 is a graph illustrating a control example in a transition period T12, a transition period T13, and a transition period T23 in a third modified example.

FIG. 21 is a graph illustrating a control example in a transition period T12, a transition period T13, and a transition period T23 in a third modified example. The horizontal axis represents the duration time of the operating mode just before the transition period, and the vertical axis represents the length of the transition period.

In an example illustrated in FIG. 21, the transition period T12, the transition period T13, and the transition period T23 are lengthened as a duration time of the operating mode just before the transition period becomes longer.

Figure 22:
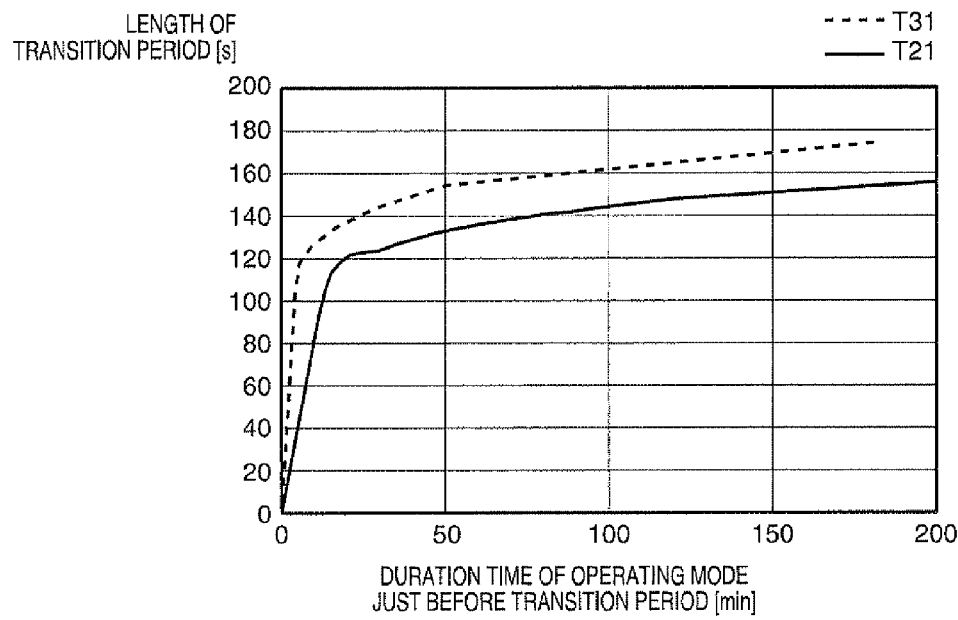
FIG. 22 a graph illustrating a control example in a transition period T31 and a transition period T21 in the third modified example.

FIG. 22 is a graph illustrating a control example in a transition period T31 and a transition period T21 in a third modified example. The horizontal axis represents the duration time of the operating mode just before the transition period, and the vertical axis represents the length of the transition period.

In an example illustrated in FIG. 22, the transition period T31 and the transition period T21 are lengthened as a duration time of the operating mode just before the transition period becomes longer.

As the time when a specified operating mode continues becomes longer, the shape of the electrode of the discharge lamp 90 becomes a shape which is stable and is easily driven in the operating mode, and thus a difference between the shape and a shape which is stable and is easily driven in another operating mode becomes larger. Accordingly, by controlling the discharge lamp driving unit 230 so that the length of the transition period becomes longer as the time when the operating mode just before the transition period continues becomes longer, and by changing the shape of the electrode gently, the occurrence of flicker can be further suppressed.

5. Projector Related to a Fourth Modified Example

Next, a projector related to the fourth modified example will be described. The configuration such as an optical system and circuits of the projector related to the fourth modified example is the same as that of the above-described projector 500. Accordingly, a detailed example of the driving current I in the fourth modified example will be described hereinafter.

The control unit 40 may control the discharge lamp driving unit 230 so that the average value of the frequency of the driving current I in the former half of the transition period becomes larger as the time when the operating mode just before the transition period continues becomes longer.

As the time when the specified operating mode continues becomes longer, the shape of the electrode of the discharge lamp 90 becomes a shape which is stable and is easily driven in the operating mode, and thus the difference between the shape and a shape which is stable and is easily driven in another operating mode becomes larger. Accordingly, by controlling the discharge lamp driving unit 230 so that the average value of the frequency of the driving current I in the former half of the transition period becomes larger as time when the operating mode just before the transition period continues becomes longer, the position of the origin of the discharge on the electrode of the discharge lamp 90 can be earlier stabilized in the case where the maximum value of the driving power becomes smaller through the switching of the operating mode. Further, in the case where the maximum value of the driving power becomes larger through the switching of the operating mode, the loss of the protrusion that becomes the origin of the discharge on the electrode of the discharge lamp 90 can be further suppressed. Accordingly, a projector that can further suppress the occurrence of flicker can be realized.

6. Projector Related to a Fifth Modified example

Next, a projector related to the fifth modified example will be described. The configuration such as an optical system and circuits of the projector related to the fifth modified example is the same as that of the above-described projector 500. Accordingly, a detailed example of the driving current I in the fifth modified example will be described hereinafter.

The projector related to the fifth modified example includes a state detection unit detecting a deterioration state of the discharge lamp 90, and the control unit 40 may control the discharge lamp driving unit 230 so that the length of the transition period becomes longer in accordance with the progress of the deterioration state detected by the state detection unit.

As mentioned in the section of "1-3. Configuration of a discharge lamp lighting device in this embodiment", the voltage detection unit 60 illustrated in FIG. 4 corresponds to the state detection unit. That is, in the projector related to the fifth modified example, the state detection unit (voltage detection unit 60) detects a driving voltage V1$a$ as the value that indicates the degree of the deterioration state of the discharge lamp 90. In general, if the deterioration state of the electrode of the discharge lamp 90 proceeds, the driving voltage V1$a$ becomes larger.

The value that indicates the degree of the deterioration state is not limited to the value of the driving voltage V1$a$, and the state detection unit, for example, may detect the temporal change of the driving voltage V1$a$ of the discharge lamp 90, the light quantity of the discharge lamp 90, the temporal change of the light quantity of the discharge lamp 90, the accumulated light-on time of the discharge lamp 90, or the like.

Since the meltability of the electrode is lowered with the progress of the deterioration state of the electrode of the discharge lamp 90, the electrode is liable to be changed to an unintended shape, and the risk of flicker occurrence becomes heightened. Accordingly, by controlling the discharge lamp driving unit 230 so that the length of the transition period becomes longer in accordance with the progress of the deterioration state, the position of the origin of the discharge on the electrode of the discharge lamp 90 is earlier stabilized, and thus the occurrence of flicker can be suppressed.

7. Projector Related to a Sixth Modified Example

Next, a projector related to the sixth modified example will be described. The configuration such as an optical system and circuits of the projector related to the sixth modified example is the same as that of the above-described projector 500. Accordingly, a detailed example of the driving current I in the sixth modified example will be described hereinafter.

The projector related to the sixth modified example includes a state detection unit detecting the deterioration state of the discharge lamp 90, and the control unit 40 may control the discharge lamp driving unit 230 so that the average value of the frequency of the driving current I in the former half of the transition period becomes larger in accordance with the progress of the deterioration state.

Hereinafter, the transition period T13 is exemplified. Further, the principle to be described hereinafter may be applied in the same manner even in the case of another transition period.

Figure 23:
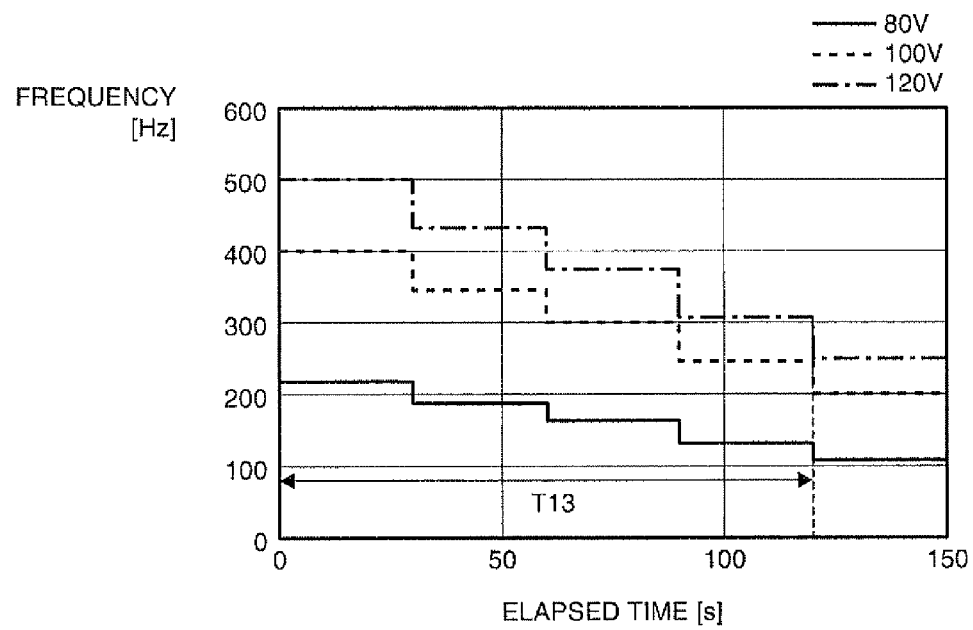
FIG. 23 is a graph illustrating a control example in a transition period T13 in a sixth modified example.

FIG. 23 is a graph illustrating a control example in a transition period T13 in a sixth modified example. The horizontal axis represents an elapsed time from the start of the transition period, and the vertical axis represents the frequency of the driving current I. In FIG. 23, the frequency of the driving current I in the case where the driving voltage V1a is 80 V is indicated by a solid line, the frequency of the driving current I in the case where the driving voltage V1a is 100 V is indicated by a dotted line, and the frequency of the driving current I in the case where the driving voltage V1a is 120 V is indicated by a dashed-dotted line.

In an example illustrated in FIG. 23, the average value of the frequency of the driving current I in the former half of the transition period T13 in the case where the driving voltage V1a is 80 V becomes 205 Hz. Further, the average value of the frequency of the driving current I in the former half of the transition period T13 in the case where the driving voltage V1a is 100 V becomes 373 Hz. Further, the average value of the frequency of the driving current I in the former half of the transition period T13 in the case where the driving voltage V1a is 120 V becomes 486 Hz.

In general, if the deterioration state of the electrode of the discharge lamp 90 proceeds, the driving voltage V1a becomes larger. In the example illustrated in FIG. 23, the control unit 40 controls the discharge lamp driving unit 230 so that the average value of the frequency of the driving current I in the former half of the transition period becomes larger in accordance with the progress of the deterioration state detected by the state detection unit.

Since the meltability of the electrode is lowered with the progress of the deterioration state of the electrode of the discharge lamp 90, the electrode is liable to be changed to an unintended shape, and the risk of flicker occurrence becomes heightened. Accordingly, by controlling the discharge lamp driving unit 230 so that the average value of the frequency of the driving current in the former half of the transition period becomes larger in accordance with the progress of the deterioration state, the position of the origin of the discharge on the electrode of the discharge lamp 90 is earlier stabilized, and thus the occurrence of flicker can be suppressed.

8. Projector Related to a Seventh Modified Example

Next, a projector related to the seventh modified example will be described. The configuration such as an optical system and circuits of the projector related to the seventh modified example is the same as that of the above-described projector 500. Accordingly, a detailed example of the driving current I in the seventh modified example will be described hereinafter.

In the case where the first average power that is the average value of the driving power in the operating mode before the transition period is different from the second average power that is the average value of the driving power in the operating mode after the transition period, the control unit 40 may control the discharge lamp driving unit 230 so that the driving power becomes an intermediate value between the first average power and the second average power in at least a part of the transition period.

Hereinafter, the transition period T13 and the transition period T31 are exemplified. Further, the principle to be described hereinafter may be applied in the same manner even in the case of another transition period.

Figure 24:
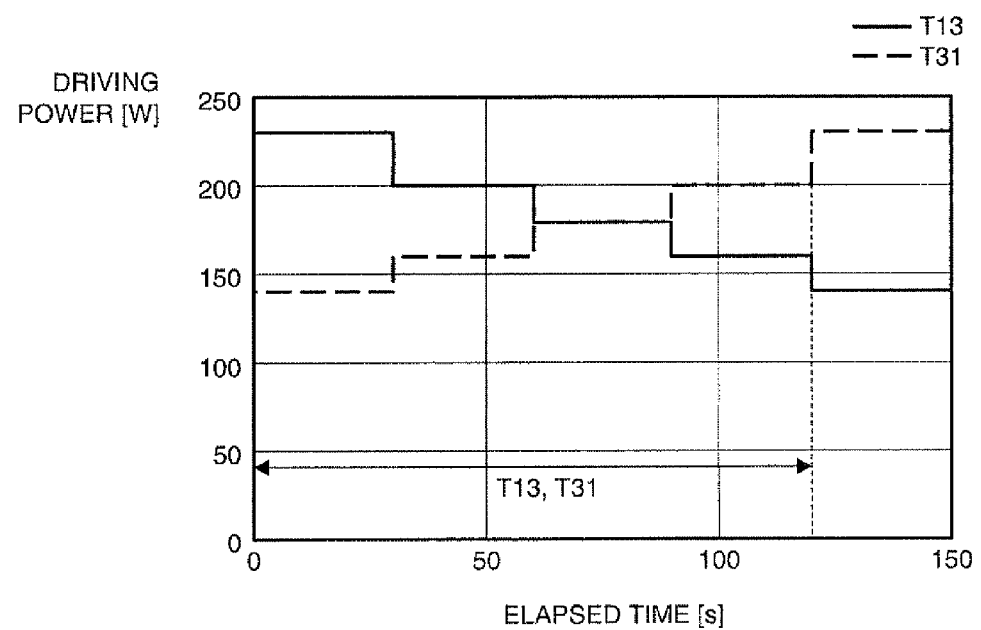
FIG. 24 is a graph illustrating a control example in a transition period T13 and a transition period T31 in a seventh modified example.

FIG. 24 is a graph illustrating a control example in the transition period T13 and the transition period T31 in the seventh modified example. The horizontal axis represents an elapsed time from the start of the transition period, and the vertical axis represents the driving power. In FIG. 24, the driving power in the transition period T13 is indicated by a solid line, and the driving power in the transition period T31 is indicated by a dashed line.

The operating mode just before the transition period T13 is the first mode, and the average value of the driving power is 230 W. The operating mode just after the transition period T13 is the third mode, and the average value of the driving power is 140 W. The operating mode just before the transition period T31 is the third mode, and the average value of the driving power is 140 W. The operating mode just after the transition period T31 is the first mode, and the average value of the driving power is 230 W.

In an example illustrated in FIG. 24, in the transition period T13, the driving power becomes lower by stages from 230 W to 160 W. Further, in the transition period T31, the driving power becomes higher by stages from 140 W to 200 W. That is, the control unit 40 controls the discharge lamp driving unit 230 so that the driving power becomes the intermediate value between the first average power and the second average power.

As described above, by changing the shape of the electrode more gently through changing of the driving power gently in the transition period, the occurrence of flicker can be further suppressed.

In the above-described embodiments, a projector using three liquid crystal panels is exemplified. However, the invention is not limited thereto, and a projector using one, two, or four or more liquid crystal panels may be adopted.

In the above-described embodiments, a transmission type projector is exemplified. However, the invention is not limited thereto, and can be applied to a reflection type projector. Here, the "transmission type" means a type in which an electro-optical modulator transmits light as optical modulation means such as a transmission type liquid crystal panel, and the "reflection type" means a type an which the electro-optical modulator reflects light as optical modulation means such as a reflection type liquid crystal panel or a micro-mirror type optical modulator. As the micro mirror type optical modulator, for example, DMD (Digital Micro-mirror Device: trademark of Texas Instruments Inc.). Even in the case of applying the invention to the reflection type projector, the same effect as the transmission type projector can be obtained.

The invention is applicable to a front projection type projector that projects a projected image from the side of observing the projected image and to a rear projection type projector that projects the projected image from the side opposite to the side of observing the projected image.

In the above-described embodiments, in the period of a polarity-reversed ½ cycle of the driving current I, the absolute value of the driving current I becomes constant. That is, the waveform of the driving current I is in a rectangular shape. The waveform of the driving current I is not limited thereto, and may be a waveform in which the absolute value of the driving current I has a different value in the period of polarity-reversed period of the driving current I, such as a waveform that starts in a period in which the absolute value of the driving current I becomes the first current value and ends in a period in which the absolute value of the driving current I becomes the second current value that is larger than the first current value in the period of the polarity-reversed half cycle of the driving current I or a waveform in which the absolute value of the driving current I is monotonically increased in the period of the polarity-reversed half cycle of the driving current I.

Further, the invention is not limited to the above-described embodiments, and diverse modifications can be made within the scope of the invention.

The invention includes substantially the same configuration (for example, a configuration having the same function, method, and results, or a configuration having the same purpose and effect) as the configuration described in the embodiments. Further, the invention includes a configuration in which nonessential portions of the configuration described in the embodiments are replaced. Further, the invention includes a configuration that brings the same effect as the configuration described in the embodiment or a configuration that can achieve the same purpose. Further, the invention includes a configuration to which a known technology is added as the configuration described in the embodiments.

The entire disclosure of Japanese Patent Application No. 2011-064816, filed Mar. 23, 2011 is expressly incorporated by reference herein.

What is claimed is:

1. A projector comprising:
    a discharge lamp;
    a discharge lamp driving unit that drives the discharge lamp by supplying a driving power to the discharge lamp through supply of a driving current thereto; and
    a control unit that controls the discharge lamp driving unit based on plural operating modes in which maximum values of the driving power are different from one another,
    wherein the control unit switches the operating mode through a transition period and controls the discharge lamp driving unit so that an average value of a frequency of the driving current in the former half of the transition period becomes larger than an average value of a frequency of the driving current in the latter half of the transition period.

2. The projector according to claim 1, wherein the control unit controls the discharge lamp driving unit so that a minimum value of the frequency of the driving current in the former half of the transition period becomes larger than a minimum value of the frequency of the driving current in the latter half of the transition period.

3. The projector according to claim 1, wherein in the case where the operating mode after the transition period is a mode that repeats a first period in which the driving power is relatively low and a second period in which the driving power is relatively high, the control unit controls the discharge lamp driving unit so that a minimum value of the frequency of the driving current in the second period in the former half of the transition period becomes larger than a minimum value of the frequency of the driving current in the second period in the latter half of the transition period.

4. The projector according to claim 1, wherein the control unit controls the discharge lamp driving unit so that a ratio of time when the frequency of the driving current in the former half of the transition period becomes a minimum value to time in the former half of the transition period becomes smaller than a ratio of time when the frequency of the driving current in the latter half of the transition period becomes a minimum value to time in the latter half of the transition period.

5. The projector according to claim 1, wherein in the case where the operating mode after the transition period is a mode that repeats a first period in which the driving power is relatively low and a second period in which the driving power is relatively high, the control unit controls the discharge lamp driving unit so that a ratio of time when the frequency of the driving current in the second period in the former half of the transition period becomes a minimum value to time in the former half of the transition period becomes smaller than a ratio of time when the frequency of the driving current in the second period in the latter half of the transition period becomes a minimum value to time in the latter half of the transition period.

6. The projector according to claim 1, wherein the control unit controls the discharge lamp driving unit so that a length of the transition period becomes longer as time when the operating mode just before the transition period continues becomes longer.

7. The projector according to claim 1, wherein the control unit controls the discharge lamp driving unit so that the average value of the frequency of the driving current in the former half of the transition period becomes larger as time when the operating mode just before the transition period continues becomes longer.

8. The projector according to claim 1, wherein the control unit controls the discharge lamp driving unit so that a length of the transition period becomes longer as a difference between the maximum value of the driving power in the operating mode before the transition period and the maximum value of the driving power in the operating mode after the transition period becomes larger.

9. The projector according to claim 1, wherein the control unit controls the discharge lamp driving unit so that the average value of the frequency of the driving current in the former half of the transition period becomes larger as a difference between the maximum value of the driving power in the operating mode before the transition period and the maximum value of the driving power in the operating mode after the transition period becomes larger.

10. The projector according to claim 1, further comprising a state detection unit detecting a deterioration state of the discharge lamp,
    wherein the control unit controls the discharge lamp driving unit so that a length of the transition period becomes longer in accordance with progress of the deterioration state.

11. The projector according to claim 1, further comprising a state detection unit detecting a deterioration state of the discharge lamp,
    wherein the control unit controls the discharge lamp driving unit so that the average value of the frequency of the driving current in the former half of the transition period becomes larger in accordance with the progress of the deterioration state.

12. The projector according to claim 1, wherein in the case where a first average power that is an average value of the driving power in the operating mode before the transition period is different from a second average power that is an average value of the driving power in the operating mode after the transition period, the control unit controls the discharge lamp driving unit so that the driving power becomes an intermediate value between the first average power and the second average power in at least a part of the transition period.

* * * * *